(12) United States Patent
Fujisawa et al.

(10) Patent No.: US 7,380,251 B2
(45) Date of Patent: May 27, 2008

(54) DISK APPARATUS

(75) Inventors: Shinichi Fujisawa, Tokyo (JP); Taku Sato, Tokyo (JP)

(73) Assignee: TEAC Corporation, Tokyo (JP)

( * ) Notice: Subject to any disclaimer, the term of this patent is extended or adjusted under 35 U.S.C. 154(b) by 583 days.

(21) Appl. No.: 11/064,522

(22) Filed: Feb. 23, 2005

(65) Prior Publication Data

US 2005/0216925 A1   Sep. 29, 2005

(30) Foreign Application Priority Data

Feb. 24, 2004 (JP) .............................. 2004-048334
Nov. 25, 2004 (JP) .............................. 2004-340611

(51) Int. Cl.
*G11B 17/04* (2006.01)

(52) U.S. Cl. .................................................. 720/616

(58) Field of Classification Search ................ 720/616, 720/618, 619, 620, 622, 623
See application file for complete search history.

(56) References Cited

U.S. PATENT DOCUMENTS

| | | | | |
|---|---|---|---|---|
| 5,195,077 A | * | 3/1993 | Ishikawa et al. ............ | 720/623 |
| 5,416,763 A | * | 5/1995 | Ohsaki ........................ | 720/623 |
| 6,084,838 A | * | 7/2000 | Tanaka et al. ............... | 720/620 |
| 6,330,216 B1 | | 12/2001 | Nishimura et al. | |
| 6,542,453 B1 | * | 4/2003 | Yamada et al. ............. | 720/616 |
| 6,826,766 B2 | * | 11/2004 | Tuchiya ....................... | 720/620 |
| 6,839,898 B2 | | 1/2005 | Saji et al. | |
| 6,918,127 B2 | | 7/2005 | Maeda et al. ............... | 720/620 |
| 2003/0227856 A1 | * | 12/2003 | Kim et al. ................... | 369/77.1 |

FOREIGN PATENT DOCUMENTS

| | | |
|---|---|---|
| JP | 10-302365 A | 11/1998 |
| JP | 11-162064 A | 6/1999 |
| JP | 2002-117604 | 4/2002 |
| JP | 2003-016710 A | 1/2003 |

* cited by examiner

*Primary Examiner*—A. J. Heinz
*Assistant Examiner*—Mark Blouin
(74) *Attorney, Agent, or Firm*—Weingarten, Schurgin, Gagnebin & Lebovici LLP

(57) ABSTRACT

A disk apparatus comprises a slot for inserting a disk-shaped recording medium therethrough, a first guide member for guiding one side of the disk inserted through the slot, a second guide member for guiding the other side of the disk inserted through the slot, a disk abutting portion for abutting the disk inserted through the slot, a disk support arm for carrying the disk by supporting and swinging the disk and a recording/reproducing unit for recording and/or reproducing information on and/or from the disk carried into the apparatus by the disk support arm, wherein a first disk having a diameter dA is loaded or unloaded by swinging the disk support arm, and wherein the disk support arm is disposed such that the disk abutting portion abuts and the disk support arm inhibits further insertion of a second disk having a diameter dB that is smaller than dA before the entire insertion of the second disk into the apparatus through any place of the slot while waiting for the insertion of the first disk through the slot.

9 Claims, 21 Drawing Sheets

DISK APPARATUS

This application claims priority to Japanese application No. 2004-048334 filed Feb. 24, 2004, and to Japanese application No. 2004-340611 filed Nov. 25, 2004.

BACKGROUND OF THE INVENTION

1. Field of the Invention

The present invention relates to a disk apparatus which drives a disk (for example, CD-R/RW, DVD–R/–RW/RAM/+R/+RW, etc.), a recording medium which records a large amount of information, among information equipment, such as various computer systems, and in particular, to a structure of the disk apparatus which can prevent the erroneous insertion of disks which are different in diameter.

2. Description of the Related Art

Generally, a conventional disk apparatus built in a personal computer (hereinafter referred to as 'PC') or the like has a disk tray for loading a disk and said disk tray is constructed to advance or retreat. Also, a disk loaded in the disk tray is driven in a main body of the disk apparatus to record or reproduce information.

On the other hand, as another type of disk apparatus without a disk tray, a so-called slot-in type disk apparatus is also frequently employed. This type of disk apparatus is suitable to make a PC slim and small. Since the slot-in type disk apparatus is not provided with a disk tray for loading or unloading a disk to or from a main body of the apparatus, when an operator inserts over half of a disk into the insertion opening (slot), a loading mechanism of the apparatus body is then operated to load the disk automatically.

FIGS. 23 and 24 illustrate a construction and an operation of a loading mechanism in a conventional slot-in type disk apparatus. In the construction illustrated in the figures, when an operator inserts a disk D, the disk D is regulated by a pin 100a provided at the tip of a first swing body 100, right and left guide bodies 101 and 102, and, from the midway, a pin 103a provided at the tip of a second swing body 103 on its elevation and right and left positions, and reaches a position illustrated in FIG. 23.

At this time, the first swing body 100 is rotated in the direction of an arrow 100A by the disk D that pushes the pin 100a provided at the tip of the first swing body 100, and the second swing body 103 is also rotated in the direction of an arrow 103A by the disk D that pushes the pin 103a provided at the tip of the second swing body 103. Also, a switching lever 104 is pushed by the end of the second swing body 103 and is rotated in the direction of an arrow 104A, and then a detecting switch 105 is operated.

When the detecting switch 105 is operated, a driving means 106 begins to operate, and a first sliding member 107 begins to move in the direction of an arrow 107A. The first sliding member 107 and a second sliding member 108 are connected to a slider coupling member 109 at the tip of each sliding member, and the slider coupling member 109 is pivotally fixed by a pin 110, and the second sliding member 108 advances in the direction of an arrow 108A when the first sliding member 107 retreats.

When the first sliding member 107 begins to retreat in that way, a follower pin 100b is guided in a cam groove 107a of the first sliding member 107, and the first swing body 100 supported by the first sliding body 107 in a cantilever-shape is rotated in the direction of an arrow 100B with a supporting point 100c as a rotating center. With these operations, the disk D is carried in the direction of the arrow 107A by the pin 100a provided at the tip of the first swing body 100 to a position where the disk D abuts pins 111a and 111b of a disk positioning member 111.

At this time, since the pin 103a of the second swing member 103 is rotated in the direction of the arrow 103A, the pin 103a of the second swing member 103 is moved in the direction of the arrow 103A while it synchronizes with the pin 100a at the tip of the first swing body 100 to support the disk D. Also, the pin 103a of the second swing member 103 is rotated to the position slightly away from the disk D after the disk D abuts the pins 111a and 111b of the disk positioning member 111.

The operation aspect of a loading mechanism when a disk D is loaded into the disk apparatus has been described hitherto. The operation aspect of a loading mechanism when a disk D is unloaded out of the apparatus is opposite to the above-mentioned operation. That is, when a disk D is at a fixed position in the disk apparatus, and a driving means 106 begins to operate in the reverse direction according to the instruction of unloading, the first sliding member 107 begins to advance in the direction of an arrow 107B, and, the second sliding member 108 connected to the first sliding member 107 by the slider coupling member 109 synchronously begins to retreat in the direction of an arrow 108B. Then, the first and second swing bodies 100 and 103 begins to swing in the directions of arrows 100A and 103B respectively, and then the disk D is unloaded to the outside of the apparatus by the pins 100a and 103a provided at the tip of each swing body.

In the disk apparatus constructed as described above, the disk D loaded into the apparatus is clamped by a clamping head 112 that ascends and descends at a fixed position. The clamping head 112 is integrated with a turntable 113 fixed to the driving shaft of a spindle motor 114. Also, the spindle motor 114 is disposed in a frame member, and raises or lowers the frame member with an elevating mechanism (for example, Japanese Unexamined Patent Application Publication No. 2002-117604).

The disk apparatus constructed as described above aims at accurately loading a 12-cm-diameter disk into the disk apparatus. That is, the loading mechanism for loading a disk into the disk apparatus is aimed at loading a 12-cm-diameter disk, and, as shown in FIGS. 23 and 24, the pin 100a provided at the tip of the first swing body 100, the right and left guide bodies 101 and 102, and the pin 103a provided at the tip of the second swing body 103 are disposed to regulate the elevation and the right and left positions of a 12-cm-diameter disk. Also, the pins 111a and 111b of the disk positioning member 111 are disposed to determine the position of a 12-cm-diameter disk. Accordingly, a slot-in type disk apparatus constructed as described above is aimed at loading a 12-cm-diameter disk only, not a disk having a diameter other than 12 cm.

However, as a disk such as CD or DVD etc., a standardized 8-cm-diameter disk as well as a 12-cm-diameter disk exists. The 8-cm-diameter disk is widely distributed and employed especially in portable electronic devices such as video cameras etc. If an 8-cm-diameter disk is erroneously inserted into the disk apparatus through the slot, the 8-cm-diameter disk may be trapped by the loading mechanism or the entire 8-cm-diameter disk may be put into the disk apparatus, and consequently, the operator cannot pull out the 8-cm-diameter disk from the disk apparatus.

SUMMARY OF THE INVENTION

The present invention has been made in consideration of the problems in the related art. Therefore, it is an object of the present invention to provide a disk apparatus capable of preventing, even when an operator erroneously inserts a disk having a smaller diameter than a standardized diameter into the disk apparatus, a situation in which the disk cannot be pulled out of the disk apparatus.

The present invention is intended to solve the above-mentioned problem with the following means. That is, as a first aspect of the invention, there is provided a disk apparatus comprising a slot for inserting a disk-shaped recording medium therethrough; a first guide member for guiding one side of the disk-shaped recording medium inserted through the slot; a second guide member for guiding the other side of the disk-shaped recording medium inserted through the slot; a disk abutting portion for abutting the disk-shaped recording medium inserted through the slot; a disk support arm for carrying the disk-shaped recording medium by supporting and swinging the disk-shaped recording medium; and a recording/reproducing unit for recording and/or reproducing information on and/or from the disk-shaped recording medium carried into the apparatus by the disk support arm. A first disk-shaped recording medium having a diameter of dA is loaded or unloaded by swinging the disk support arm. The disk support arm is disposed such that the disk abutting portion abut and the disk support arm inhibits further insertion of a second disk-shaped recording medium having a diameter of dB that is smaller than dA before the entire second disk-shaped recording medium is inserted into the apparatus through any place of the slot while waiting for the insertion of the first disk-shaped recording medium through the slot.

As a second aspect of the invention, in addition to the features of the first aspect, supposing that thereis no disk abutting portion, an area through which the second disk-shaped recording medium passes when the second disk-shaped recording medium is inserted until a rear end of the second disk-shaped recording medium in its insertion direction coincides with the slot while being brought into sliding contact with the first guide member is defined as a first area, and an area through which the second disk-shaped recording medium passes when the second disk-shaped recording medium is inserted until a rear end of the second disk-shaped recording medium in its insertion direction coincides with the slot while being brought into sliding contact with the second guide member is defined as a second area, the disk support arm is disposed such that the disk abutting portion is located in a range within which the first area and the second area overlap each other while waiting for the insertion of a disk-shaped recording medium through the slot.

As a third aspect of the invention, in addition to the features of the first or second aspect, the diameter dA of the first disk-shaped recording medium is 12 cm, and the diameter dB of the second disk-shaped recording medium is 8 cm.

As a fourth aspect of the invention, there is provided a disk apparatus for loading or unloading a disk having a prescribed outer diameter of disk by driving a disk support arm. The apparatus comprises a disk entrance inhibiting means for inhibiting a smaller diameter disk having a smaller diameter than the prescribed outer diameter from being inserted through a disk slot out of the supporting range of the disk support arm can support the smaller diameter disk while the support arm is waiting for the loading of a disk.

As a fifth aspect of the invention, in addition to the features of the fourth aspect, the disk entrance inhibiting means is a stopper having an abutting portion which contacts a front circumferential edge of the smaller diameter disk in its entrance direction, and the stopper is attached to the support arm.

As a sixth aspect of the invention, in addition to the features of the fifth aspect, the stopper has elasticity, and when the abutting portion of the stopper is pressed by the front circumferential edge of the smaller diameter disk, the smaller diameter disk is pushed back in its unloading direction by an elastic force generated by the pressing of the disk.

As a seventh aspect of the invention, in addition to the features of the fifth or sixth aspect, when the the disk having the prescribed outer diameter is completely loaded and is not supported any more by the support arm, the abutting portion of the stopper is brought into sliding contact with an inner wall of the apparatus, to generate an anti-vibration function against the support arm.

According to the present invention, even when a smaller diameter disk-shaped recording medium is erroneously inserted, the disk abutting portion of the disk support arm necessarily abuts the disk-shaped recording medium, so that the entire disk-shaped recording medium can be prevented from being received into the apparatus, and thus the breakdown of the apparatus can be surely prevented.

DESCRIPTION OF THE PREFERRED EMBODIMENTS

Figure 1:
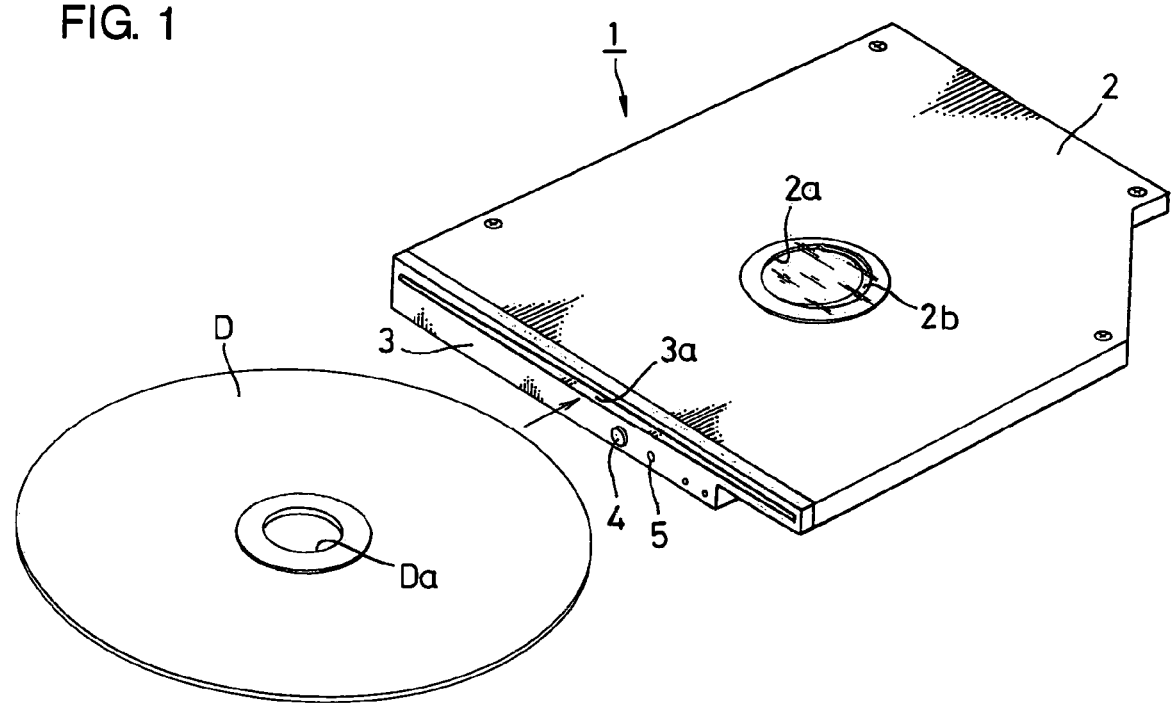
FIG. 1 is a perspective view showing the appearance of a disk apparatus related to a first embodiment of the present invention.

Hereinafter, the embodiments of the present invention will be described in detail based on the accompanying figures. FIGS. 1 to 16 illustrate a first embodiment of the present invention, and FIGS. 17 to 22 illustrate a second embodiment of the present invention. On the other hand, the components common in both embodiments are described with the same reference numerals.

FIG. 1 is a view illustrating the appearance of a slot-in type disk apparatus 1 in which the present invention is embodied. An opening 2a is formed at the center of a top plate of a chassis case 2 constructed as its shielded state, and inwardly protruding protrusions 2b are formed at a circumferential portion of the opening 2a. A bezel 3 is fixed to the front end of the chassis case 2, and the bezel 3 comprises a slot 3a into which a standardized diameter (specifically 12 cm in diameter) disk D (the first disk-shaped recording medium) is inserted; an ejection switch 4 for instructing the unloading of the disk D received in the apparatus to the outside of the apparatus, and an indicator 5 for indicating an operating state of the disk apparatus 1.

Figure 2:
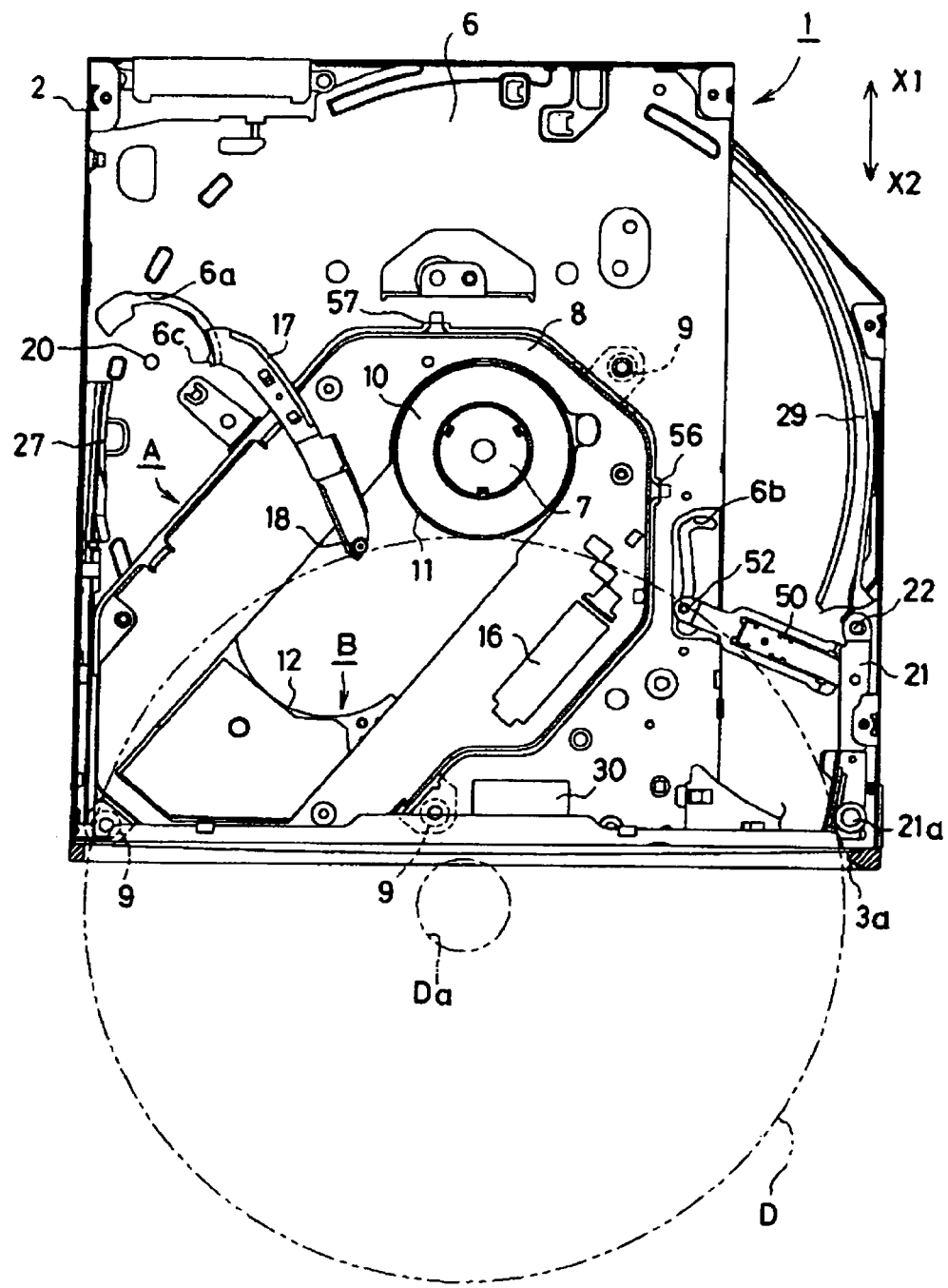
FIG. 2 is a plan view showing an internal structure of the disk apparatus in FIG. 1.
Figure 3:
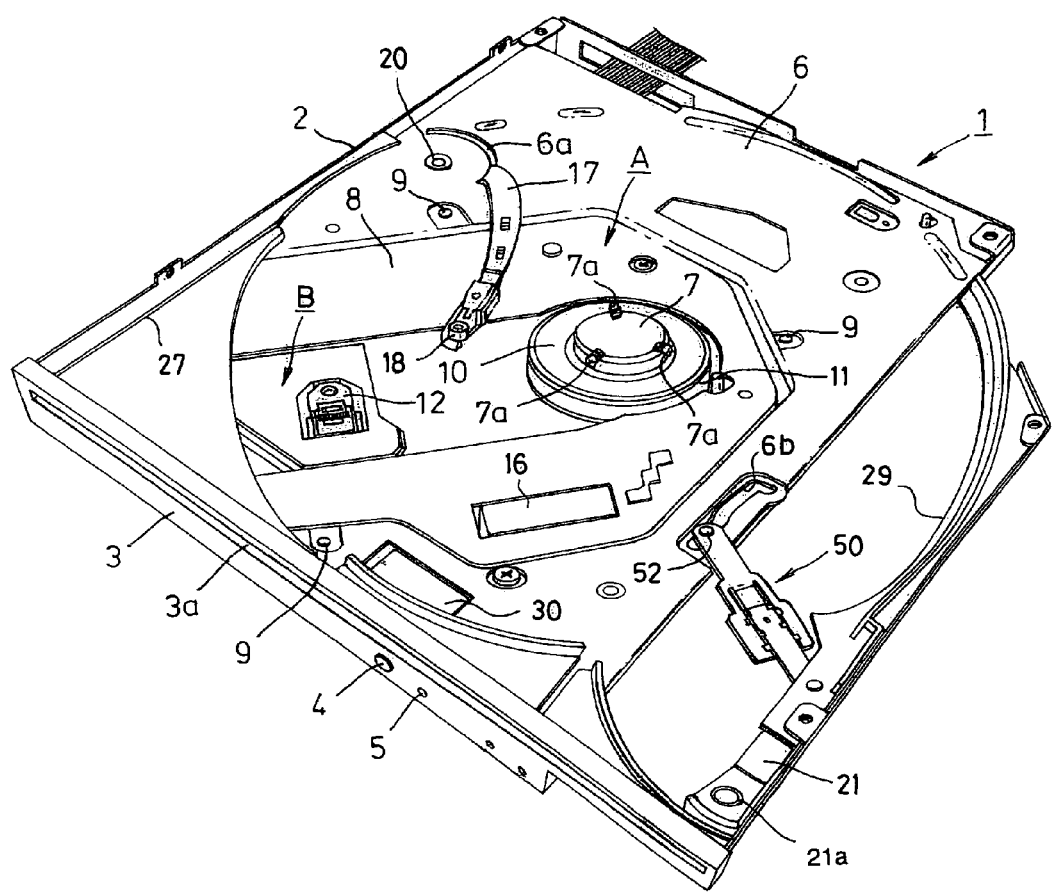
FIG. 3 is a perspective view showing the internal structure of the disk apparatus in FIG. 1.

FIG. 2 is a plan view of the disk apparatus 1 with the top plate of the chassis case 2 removed, and FIG. 3 is its perspective view. A base panel 6 is disposed within the chassis case 2, and a recording/reproducing unit A for recording and/or reproducing information on and/or from the disk D is provided to be inclined forward from the center of the base panel 6. A frame member 8 of the recording/reproducing unit A to which a clamping head 7 that clamps a center hole Da of the disk D is fixedisconnected to the base panel 6 at a plurality of locations (three locations in the present embodiment) by a well-known shock-absorbing support structure 9. Also, the frame member 8 has a cantilevered support structure in which a rear portion of the apparatus is movable up and down about the slot 3a as its swing axis to clamp or release the disk D by the clamping head 7.

The clamping head 7 is integrally formed with a turntable 10 and is fixed to a driving shaft of the spindle motor 11 disposed right below the clamping head 7. The spindle motor 11 rotationally drives the disk D clamped by the clamping head 7 and supported on the turntable 10, thereby performing recording or reproducing of information.

Next, the reference numeral B indicates a head unit supported by the frame member 8. An optical pickup 12 that radiates laser onto the disk D is supported by a guide shaft (not shown) having both ends fixed to the frame member 8 and is reciprocated by a thread motor 16 and a gear train (not shown).

The reference numeral 17 indicates a disk support arm which performs operations of guiding a 12-cm-diameter disk D into the apparatus by supporting the front end of the disk D in its insertion direction and of pushing out the disk D from the apparatus. An end of the disk support arm 17 serving as its fulcrum extends toward the rear surface of the base panel 6 via a slit 6a formed on the base panel 6, and is pivotally supported by a pivot pin 20 fixed to the rear surface of the base panel 6. Therefore, the disk support arm 17 swings within the range of the slit 6a.

A disk abutting portion 18 is fixed to the tip of the disk support arm 17 to support the disk D by abutting the front end of the disk D in its insertion direction when a 12-cm-diameter disk (a first disk-shaped recording medium) D is inserted, and to prevent the disk Ds from being received in the apparatus by abutting the front end of the disk Ds when an 8-cm-diameter disk (a second disk-shaped recording medium) Ds is inserted.

The reference numeral 21 indicates a leading arm that performs the operations of pushing a 12-cm-diameter disk D into the apparatus by supporting the rear end of the disk D and of guiding the disk D to the outside of the apparatus. The leading arm 21 has it one end rotatably supported by a pivot pin 22 fixed to the chassis case 2 and has it other end provided with a disk support portion 21a abutting the disk D.

The reference numeral 27 indicates a guide member (a first guide member) that guides the left surface of the disk D inserted through the slot 3a, and the reference numeral 29 indicates a guide member (a second guide member) that guides the right surface of the disk D inserted through the slot 3a. The disk D inserted through the slot 3a has its right and left surfaces guided by the guide members 27 and 29, and is supported by the disk support arm 17 and the leading arm 21 to be carried.

Figure 4:
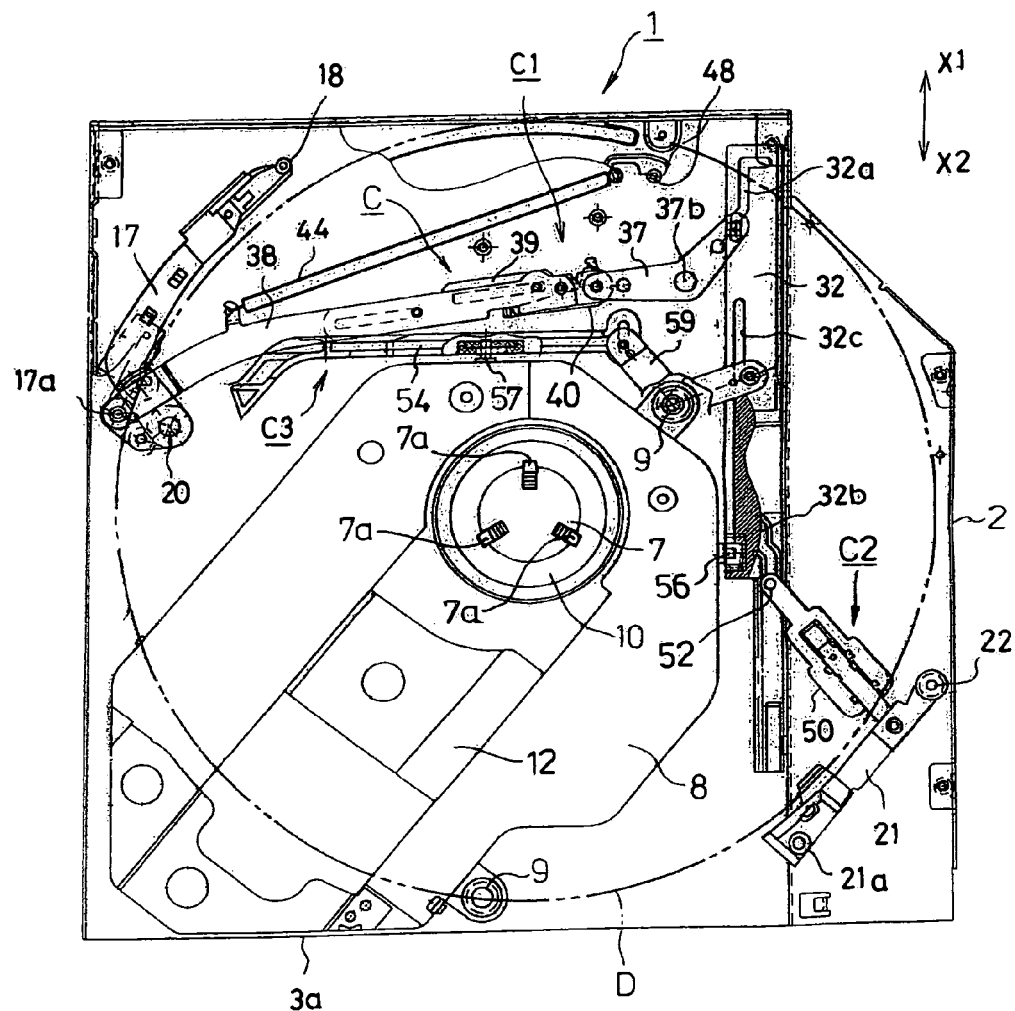
FIG. 4 is a plan view showing mechanism components constituting the interior of the disk apparatus in FIG. 1.

Next, a loading mechanism C that swings the disk support arm 17 and the leading arm 21 and moves the frame member 8 up and down will be described. FIG. 4 is a plan view showing a disk apparatus that comprises the loading mechanism C with the base panel 6 removed. The loading mechanism C comprises a loading motor 30 as a driving means; a loading slider 32 that is connected to the loading motor 30 via a gear train (not shown) and moves in the X1 and X2 directions by the driving force of the loading motor 30; and arm driving mechanisms C1 and C2 and a frame member driving mechanism C3, which are connected to the loading slider 32. The arm driving mechanism C1 swings the disk support arm 17, and the arm driving mechanism C2 swings the leading arm 21, and the frame member driving mechanism C3 moves the frame member 8 up and down.

Figure 5:
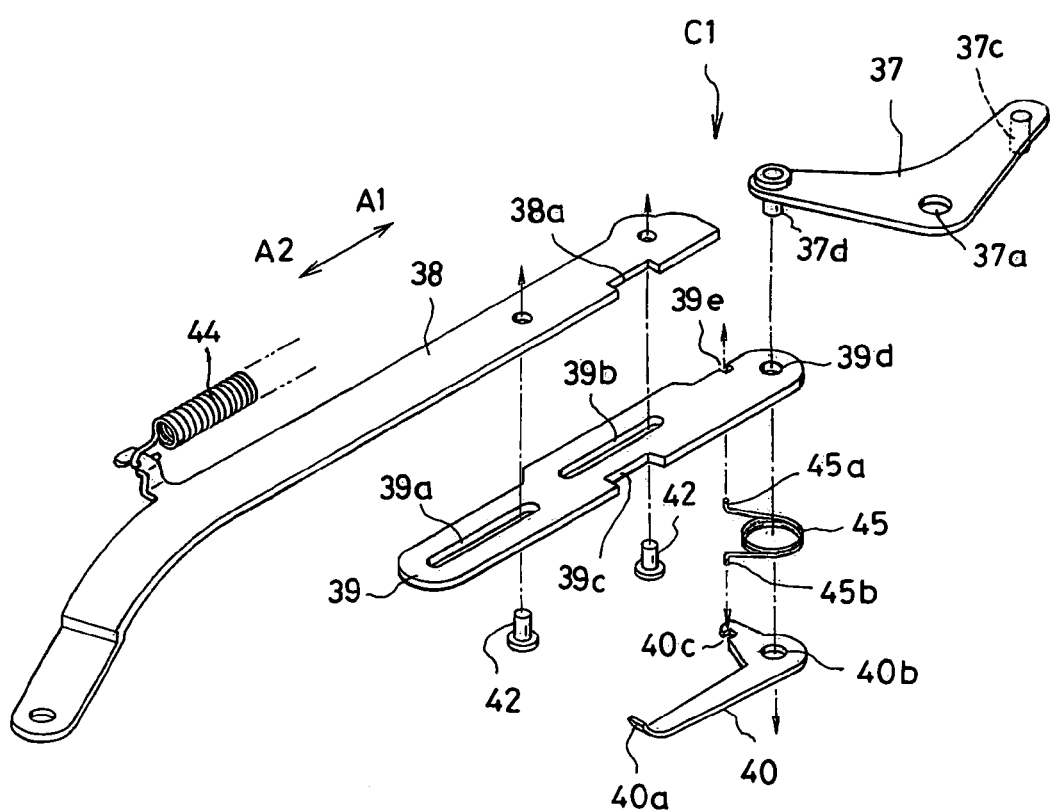
FIG. 5 is an exploded perspective view of a driving mechanism of a disk support arm.

The arm driving mechanism C1 comprises a guide groove 32a formed on the loading slider 32, a lever arm 37, a first link arm 38, a second link arm 39 and a locking lever 40. FIG. 5 is an exploded perspective view for explaining the arm driving mechanism C1. The first link arm 38 that directly drives the disk support arm 17 is connected to the disk support arm 17 by a pivot pin 17a. On the other hand, slits 39a and 39b are formed in the second link arm 39, and a rivet pin 42 is inserted through the slits 39a and 39b and is fixed to the first link arm 38 at its front end, so that an assembly of the first link arm 38 and the second link arm 39 can be integrated into one so as to be extendable within the range of the slits 39a and 39b. In addition, cutouts 38a and 39c that the locking end 40a of the locking lever 40 locks are formed in the first link arm 38 and the second link arm 39.

The reference numeral 44 illustrates a tension coil spring having its one end locked on the rear face of the base panel 6 and its other end locked on the first link arm 38. The first link arm 38 is biased in the A1 direction with an elastic force of the tension coil spring 44.

A through-hole 37a serving as the rotation axis of the lever arm 37 is supported by a pivot pin 37b fixed on the rear face of the base panel 6 (see FIG. 6) to make the lever arm 37 rotatable. Also, the lever arm 37 has a pivot pin 37c fixed to its one end and another pivot pin 37d fixed to its other end. The pivot pin 37c is fitted into the guide groove 32a of the loading slider 32, and the pivot pin 37d is inserted through the through-hole 39d of the second link arm 39 and the through-hole 40b of the locking lever 40.

Also, a torsion coil spring 45 is disposed between the second link arm 39 and the locking lever 40, and one end 45a of the torsion coil spring 45 is locked in a recessed portion 39e of the second link arm 39, and the other end 45b thereof is locked in a recessed portion 40c of the locking lever 40. Thereby, a locking end 40a of the locking lever 40 is biased in a direction that the cutout 38a of the first link arm 38 and the cutout 39c of the second link arm 39 are engaged with each other.

Meanwhile, on the rear face of the base panel 6 are disposed an limit switch 47 (see FIG. 6) which is turned on or off when the first link arm 38 reaches a predetermined position, and a starting pin 48 for pressing a rear end 40d of the locking lever 40 when the second link arm 39 reaches a predetermined position.

Figure 6:
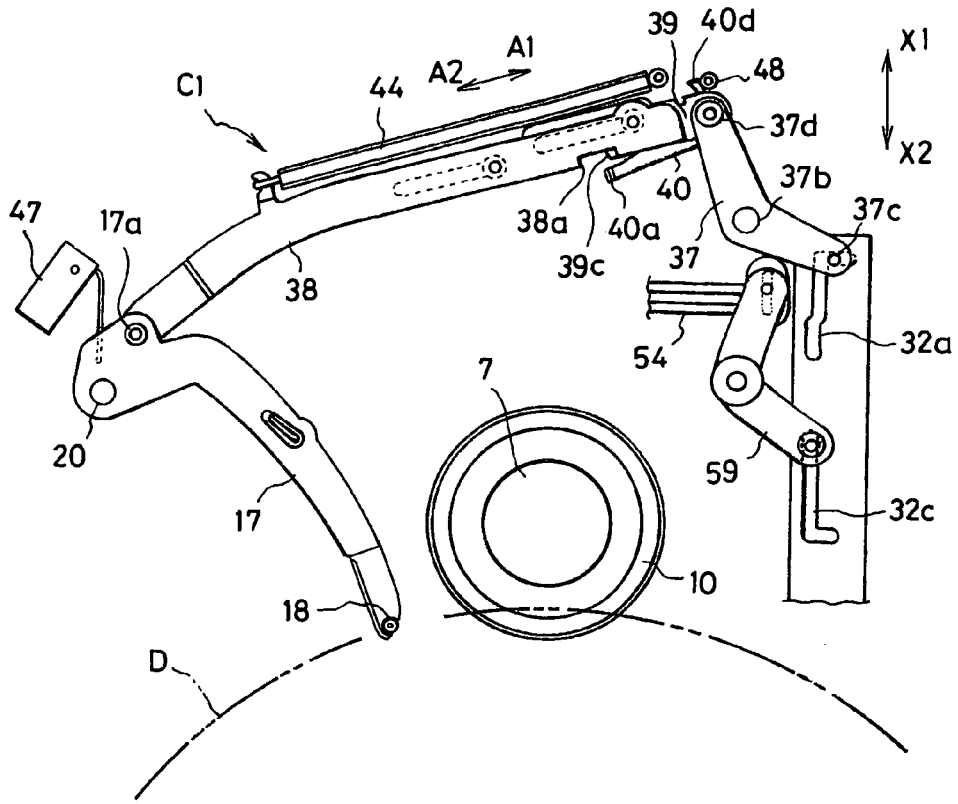
FIG. 6 shows a first process of the operation of the disk support arm.

Next, the operation aspects of the arm driving mechanism C1 and the disk support arm 17 will be described. The arm driving mechanism C1 for driving the disk support arm 17 is constructed by assembling the components shown in FIG. 5, and is operated in accordance with the advance and retreat of the loading slider 32. That is, in FIG. 6, a follower pin 37c fixed at the end of the lever arm 37 is loaded in the guide groove 32a formed in the loading slider 32, and is guided along the guide groove 32a. FIG. 6 illustrates a situation in which an operator inserts a disk D from the slot 3a of the bezel 3, and the front end of the disk abuts the disk abutting portion 18 provided at the tip of the disk support arm 17. At this time, the loading motor 30 stops, and the loading slider 32 stops at a position moved the X2 direction. When the rear end 40d of the locking lever 40 is pressed by the starting pin 48, the locking end 40a thereof is removed from the cutout 38a and 39c of the first and second link arms 38 and 39, and then the first link arm 38 can slide with respect to the second link arm 39. Then, the first link arm 38 slides in the A1 direction with respect to the second link arm 39 by an elastic force of the tension coil spring 44, and the disk support arm 17 connected to the first link arm 38 has swung in the X2 direction.

Figure 7:
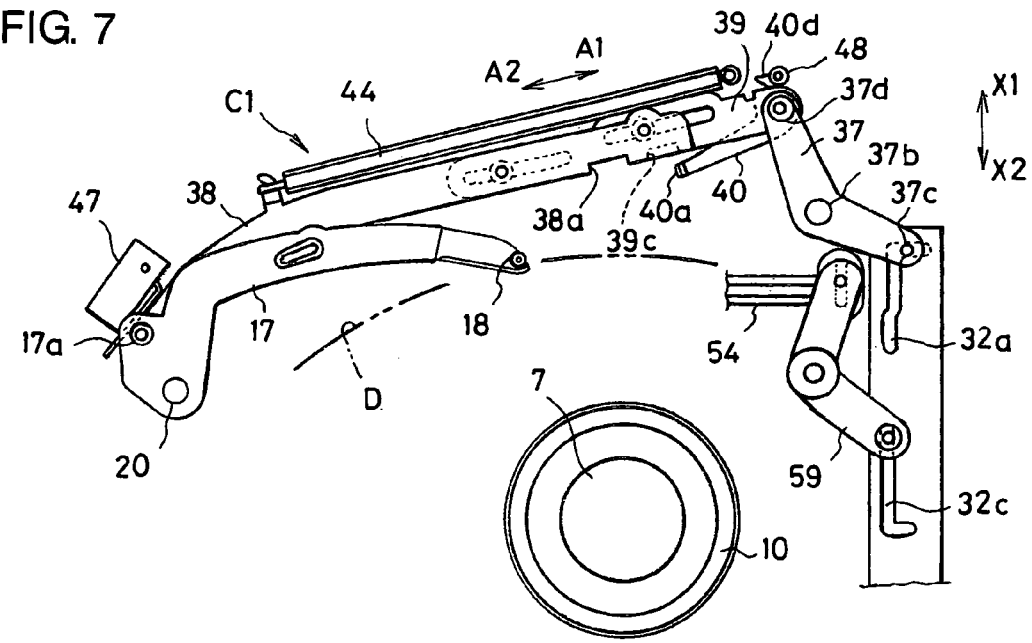
FIG. 7 shows a second process of the operation of the disk support arm.
Figure 8:
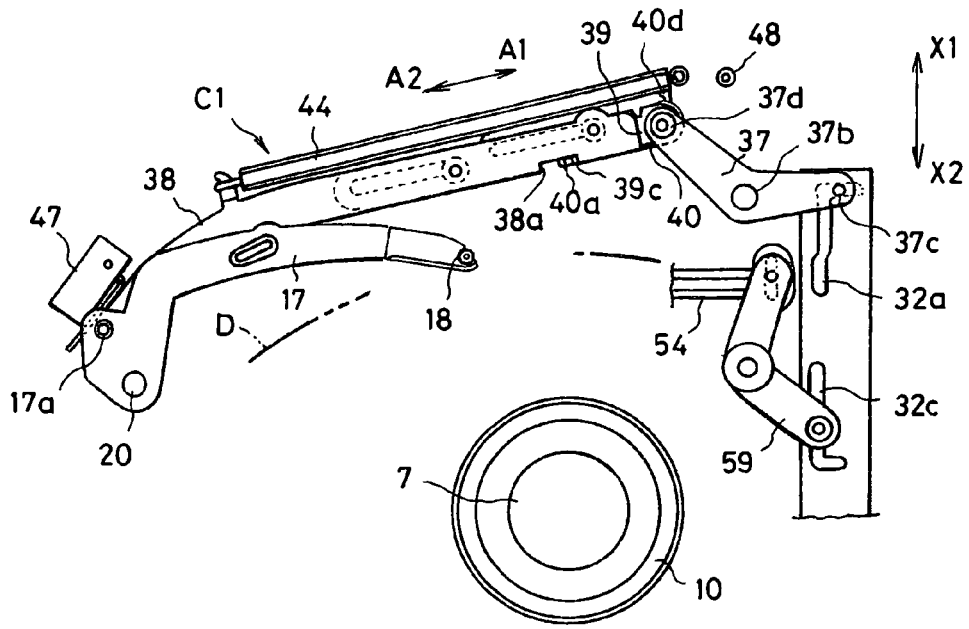
FIG. 8 shows the third process of the operation of the disk support arm.

FIGS. 7 and 8 illustrate a situation in which the operator further pushes the disk D into the apparatus step by step. The disk abutting portion 18 is pushed back by the disk D, and then the disk support arm 17 is swung back. Then, the first link arm 38 connected to the base end of the disk support arm 17 by the pivot pin 17a is pulled back. At this time, since the lever arm 37 is connected to the loading slider 32 that stands still, the second link arm 39 connected to the lever arm 37 remains at a fixed position. Therefore, the first link arm 38 slides with respect to the second link arm 39 in the A2 direction, and the assembly of the first link arm 38 and the second link arm 39 extends. Also, in the stage of FIG. 7, the limit switch 47 is operated by the disk support arm 17.

FIG. 8 illustrates a situation in which the loading motor 30 of the loading mechanism C begins to operate on the basis of the signals from the limit switch 47 operated from the above, and the loading slider 32 retreats in the X1 direction. The lever arm 37 is swung by the guide groove 32a of the loading slider 32, and the second link arm 39 slides in the A2 direction so as to follow the first link arm 38, and advances, and thereby the assembly of the first and second link arms 38 and 39 retracts. Then, the locking lever 40 opened by the pressing of the starting pin 48 rotates clockwise by the spring force of the torsion coil spring 45, and the locking end 40a thereof enters the cutouts 38a and 39c of the first and second link arms 38 and 39. This locks the first and second locking arm 38 and 39 together. In addition, in the process from FIG. 7 to FIG. 8, the arm driving mechanism C2 to be described later operates and the leading arm 21 is started to operate, and the disk D is held by the abutting portion 18 of the disk support arm 17 and the disk support portion 21a of the leading arm 21.

Figure 9:
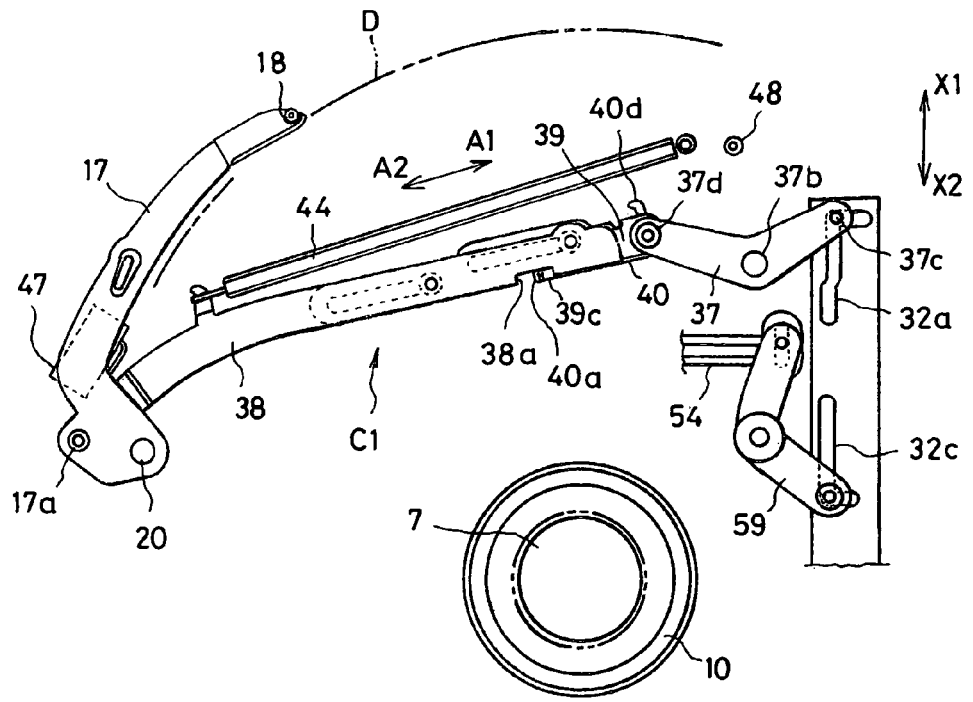
FIG. 9 shows the fourth process of the operation of the disk support arm.
Figure 10:
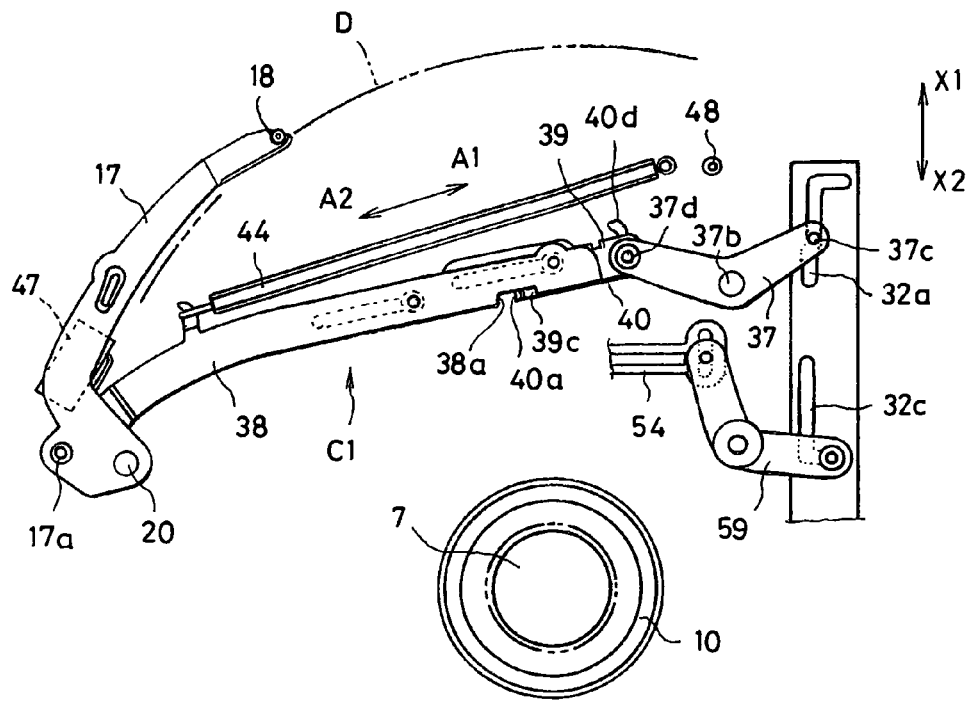
FIG. 10 shows a fifth process of the operation of the disk support arm.

FIG. 9 illustrate a situation in which the loading slider 32 further retreats in the X1 direction, the disk support arm 17 swings back, and the center hole Da of the disk D is located on the clamping head 7. In addition, at this time, the disk abutting portion 18 of the disk support arm 17 and the disk supporting portion 21a of the leading arm 21 hold the disk D, and the disk support arm 17 and the leading arm 21 swing together. Also, in the process from FIG. 9 to FIG. 10, a frame member driving mechanism C3 to be described later operates to raise the clamping head 7, and clamps the center hole Da of the disk D.

Figure 11:
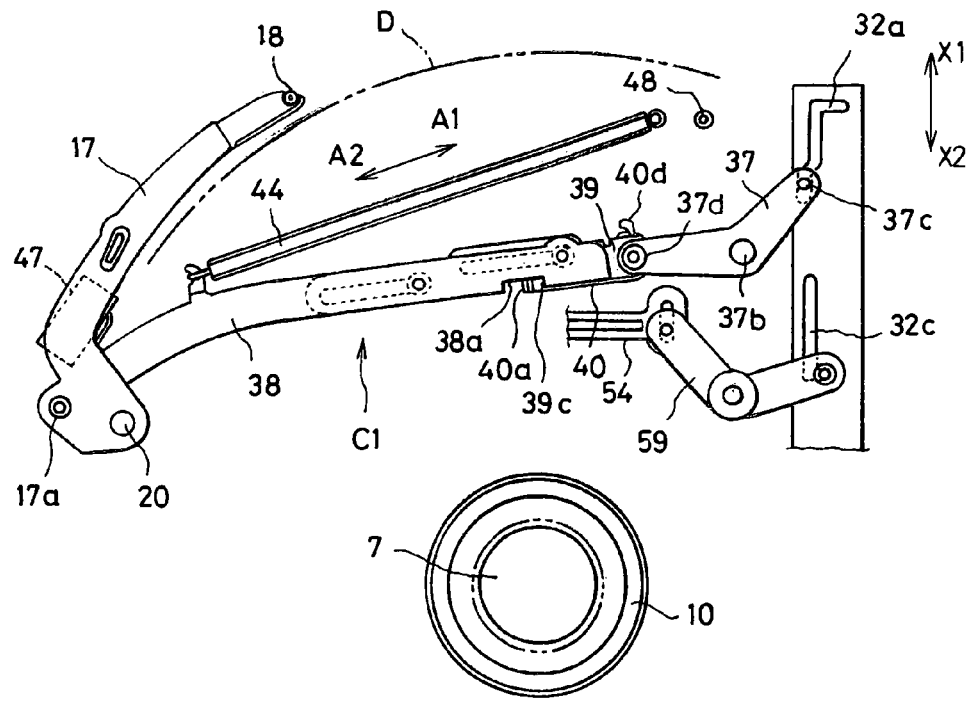
FIG. 11 shows a sixth process of the operation of the disk support arm.
Figure 12:
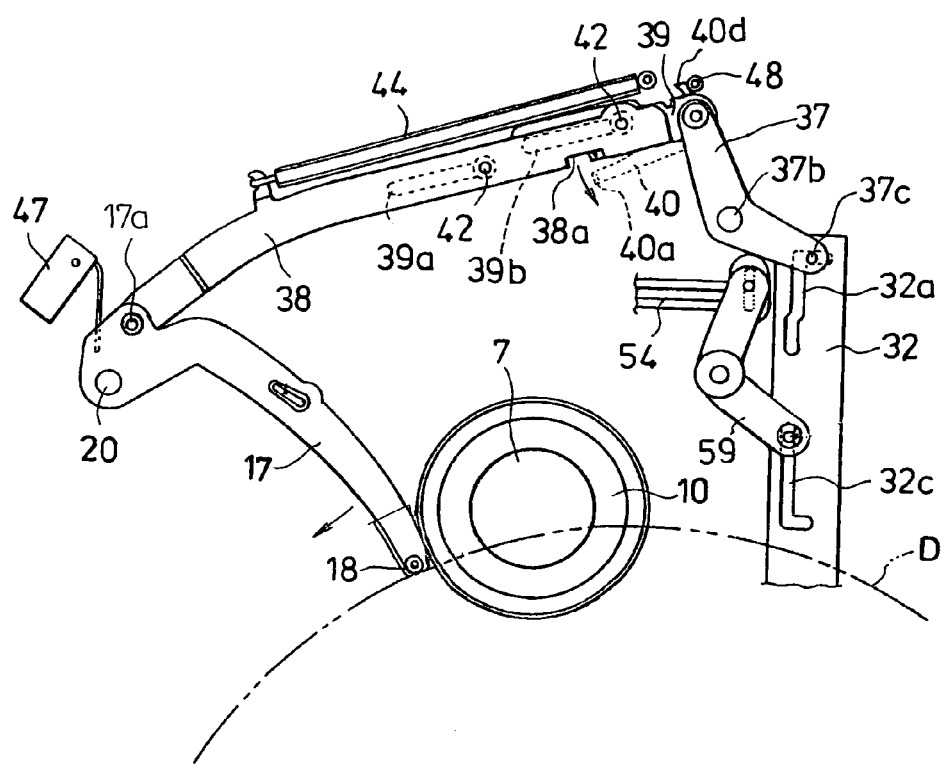
FIG. 12 illustrates the disk ejection operation of the disk support arm.

FIG. 11 illustrates a situation in which the loading slider 32 slightly retreats in the X1 direction after the clamping head 7 clamps the center hole Da of the disk D. Since the lever arm 37 swings slightly at the terminating end of the guide slit 32a of the loading slider 32, and the disk support arm 17 swings slightly as shown in FIG. 11, the holding of the optical disk is released. In addition, at this time, since the leading arm 21 also swings in the direction away from the disk D, the disk D can be driven by the turntable 7.

The operation aspect of the arm driving mechanism C1 and the disk support arm 17 when a disk D is loaded has been described hitherto. When a disk D is unloaded, the process and the operation of each component are opposite to the above. Specifically, the loading motor 30 of the loading mechanism C is driven reversely, and the loading slider 32 advances in the X2 direction, and thereby the disk support arm 17 swings forward from the state of FIG. 11 to that of FIG. 8. Thereafter, in the state of FIG. 12, the rear end 40d of the locking lever 40 abuts the starting pin 48. Then, if the loading slider 32 further advances, the rear end 40d is pressed by the starting pin 48, and thereby, as shown by broken lines in FIG. 12, the locking lever 40 swings to move the locking end 40a away from the cutout 38a and 39c of the first link arm 38 and the second link arm 39, and the locking state of the first link arm 38 and the second link arm 39 is released. At the same time, the disk support arm 17 is swung to the position shown in FIG. 6 by the biasing force of the tension coil spring 44, and finally the disk D is popped out of the slot 3a to complete the unloading.

As described above, when the disk loading operation is started, the first and second link arms 38 and 39 are in the state in which the locking is released by the locking arm 40, and as a disk D is inserted, the assembly of the first and second link arms 38 and 39 once extends and then retracts, and, in the state of FIG. 8, is locked by the locking lever 40. On the other hand, when the disk unloading operation is started, the first and second link arms 38 and 39 are in the state to be locked together by the locking arm 40. Thus, the first and second link arms 38 and 39 are not required to extend and retreat as in the loading, and, in the state of FIG. 12, the locking is released by the locking lever 40. As described above, in the unloading of the disk D, the biasing force of the tension coil spring 44 is not utilized in most of the unloading process, and the driving is controlled by the loading mechanism C. Thus, the unloading operation is always constant. Also, after the unloading, the disk D is ejected from the slot 3a of the bezel 3 and the still state always remains constant.

Next, the configuration and the operation aspect of the arm driving mechanism C2 will be described. The arm driving mechanism C2 comprises a guide groove 32c formed on the top surface of the loading slider 32; a guide slit 6b formed on the position of the base panel 6 where the guide groove 32b are overlapped; a lever arm 50 having its one end rotatably supported by the middle portion of the leading arm 21; and a follower pin 52 fixed to other end of the lever arm 50 and fitted into both the guide groove 32b and the guide slit 6b. Also, when the loading mechanism C begins to operate and the loading slider 32 moves in the X1 and X2 directions, the follower pin 52 moves while being guided along the guide groove 32b and the guide slit 6b, and thereby the lever arm 50 is displaced and the leading arm 21 swings.

Next, the configuration and the operation aspect of the frame member driving mechanism C3 will be described. The frame member driving mechanism comprises a guide groove 32c formed on the top surface of the loading slider 32; a cam groove (not shown) formed on the side surface of the loading slider 32; a slider member 54 having a cam groove at its side surface (not shown); follower pins 56 and 57 fixed to the frame member 8 and guided along the cam grooves formed on the loading slider 32 and the side face of the sliding member 54; and a link member 59 is supported by the base panel 6 so as to be rotatable about a V-shaped angled portion, and has its one end fitted into the guide groove 32c, and its other end connected to the sliding member 54. Also, when the loading mechanism C begins to operate and the loading slider 32 moves in the X1 and X2 directions, the link member 59 is driven and rotated in the guide groove 32c to slide the sliding member 54. Also, at this time, the cam grooves of the loading slider 32 and the sliding member 54 guide the follower pins 56 and 57, and thereby the frame member 8 ascends or descends.

Next, the operation aspect of the disk apparatus 1 when a 12-cm-diameter disk is loaded into the apparatus will be described. FIG. 2 illustrates a disk apparatus in a waiting state for the insertion of a disk, and FIG. 6 illustrates the disk apparatus in the state of the disk support arm 17 and the arm driving mechanism C2 at this time. At this time, the first link arm 38 can slide with respect to the second link arm 39, and thereby the disk support arm 17 can swing regardless of the operation of the loading slider 32. However, the disk support arm 17 is biased clockwise in the figure by the biasing force of the tension coil spring 44, and waits for the insertion of a disk at the end 6c of the slit 6a in the X2-direction. In addition, the leading arm 21 waits for the insertion of a disk at the position where the leading arm is moved counter-clockwise in the figure, and the frame member 8 descends and waits for the insertion of a disk. In this state, if an operator inserts a disk from the slot 3a, the front end of the disk in its insertion direction abuts the disk abutting portion 18 of the disk support arm 17.

Figure 13:
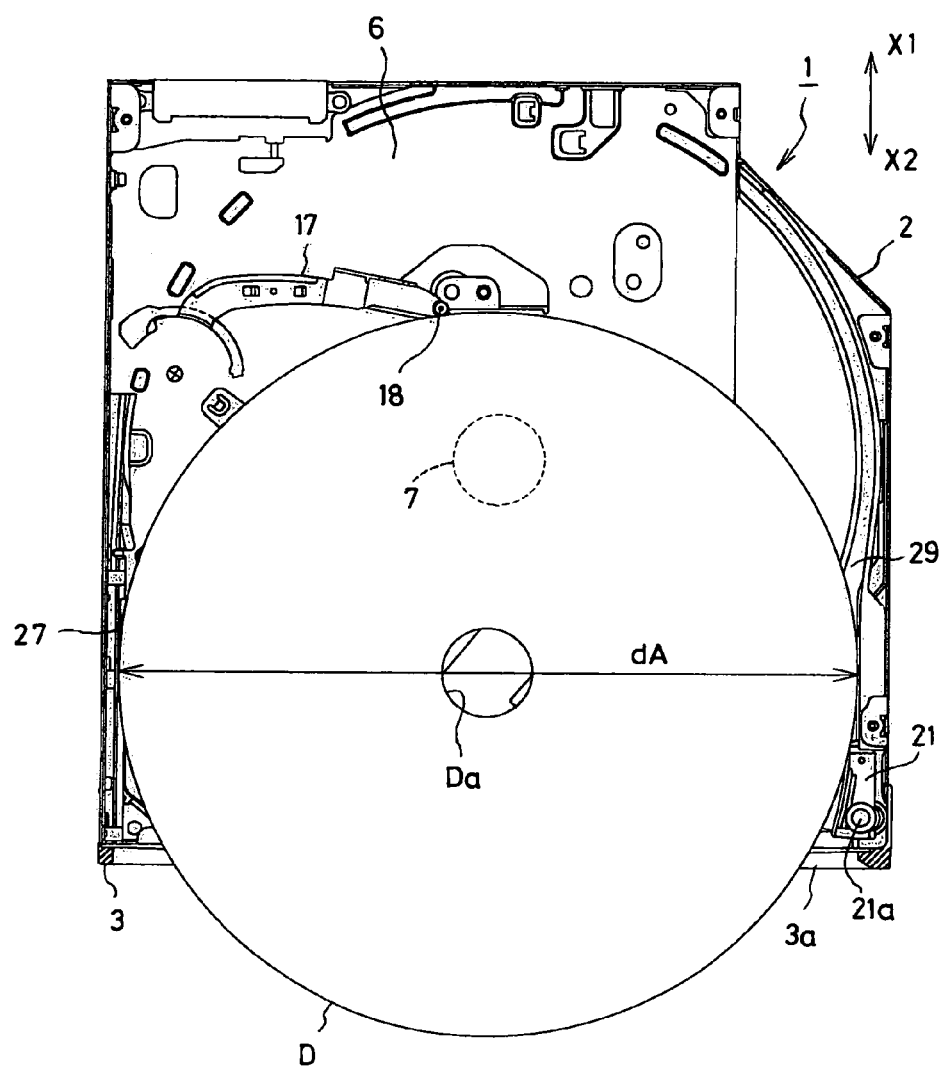
FIG. 13 illustrates an auto-loading starting state.

If the operator further pushes the disk into the apparatus, the disk abutting portion 18 is pushed back by the disk D, and then the disk support arm 17 swings back in the disk-inserting direction and reaches an auto-loading starting position shown in FIG. 7 and FIG. 13. In this state, the limit switch 47 is operated by the disk support arm 17.

When the limit switch 47 is operated, the loading motor 30 is driven and the loading mechanism C begins to operate. Then, the loading slider 32 moves in the X1 direction, and the arm driving mechanism C1 operates to integrate the first link arm 38 and the second link arm 39 into one by the operation of the locking lever 40, and also the arm driving mechanism C2 operates to swing the leading arm 21 clockwise to chuck the disk by the disk abutting portion provided at the tip of the disk support arm 17 and the disk supporting portion 21a provided at the tip of the leading arm 21. Also, the arm driving mechanism C1 and C2 operate further, and thereby the disk support arm 17 and the leading arm 21 swing, and then the disk D iscarried to the position where the center hole Da of the disk D is located on the clamping head 7. In addition, up to now, the disk support arm 17 and the leading arm 21 swing in synchronization with each other, and the disk D is still held by the disk abutting portion 18 and the disk supporting portion 21a.

Thereafter, the loading slider 32 further moves in the X1 direction, and then the frame member driving mechanism C3 is operated to ascend the frame member 8. Thereby, a chucking pawl 7a of the clamping head 7 disposed on the frame member 8 presses the opening end in the center of the disk D to the projection 2b of the chassis case 2, and, rides over the edge of the center hole Da of the disk D, locks the disk D on the turntable 10. Thus, the disk D is integrated with the turntable 10.

Thereafter, the loading slider 32 slightly moves in the X1 direction, and the arm driving mechanisms C1 and C2 operate. Thereby, as shown in FIG. 4 and FIG. 11, the disk support arm 17 and the leading arm 21 swing slightly, and the chucking of the disk D by the disk abutting portion 18 and the disk supporting portion 21a is released. At the same time, the frame member driving mechanism C3 operates, and thereby the frame member 8 descends to separate the disk D from the top plate of the chassis 2. This allows the rotation of the disk D, and the clamping operation is completed.

The operation aspect of the disk apparatus 1 when a 12-cm-diameter disk is loaded has been described hitherto. When the disk is unloaded, the process and the operation of each component are opposite to the above. Specifically, the loading slider 32 moves in the X2 direction, and thereby the frame member driving mechanism C3 lowers the frame member 8 to release the clamping of the disk D by the clamping head 7, and the arm driving mechanism C1 and C2 swing the disk support arm 17 and the leading arm 21 to chuck the disk D by the disk abutting portion 18 and the disk supporting portion 21a. Also, the loading slider 32 further moves in the X2 direction, and thereby the arm driving mechanism C1 and C2 swing the disk support arm 17 and the leading arm 21 to the position shown in FIG. 2, and thereby about half of the disk D is ejected out of the slot 3a to complete the unloading.

Figure 14:
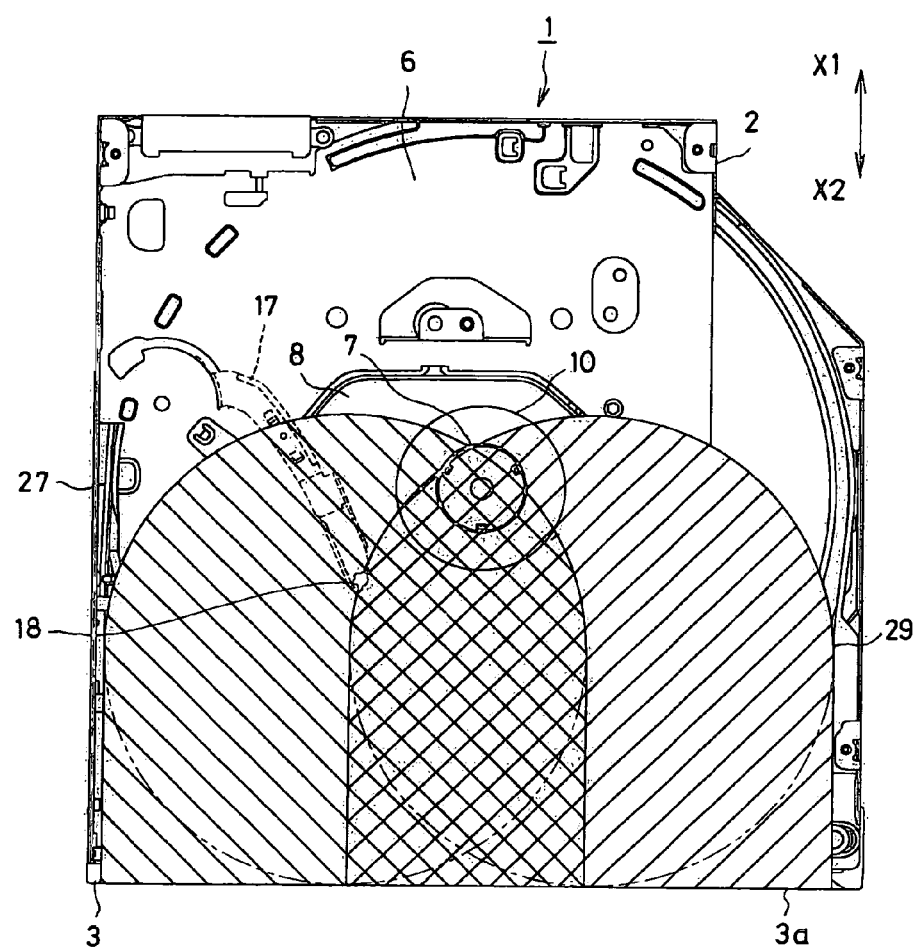
FIG. 14 illustrates the functional configuration of the present invention.

Next, the operation aspect of the disk apparatus when an 8-cm-diameter disk Ds is inserted through the slot 3a will be described with reference to FIGS. 14 to 16. In the present invention, when a 8-cm-diameter disk Ds is inserted into the apparatus which waits for the insertion of a disk D, although the insertion position of the disk Ds is the position where the slot 3a is located, the disk support arm 17 is disposed such that the disk abutting portion 18 abuts the disk Ds before the entire disk Ds is inserted into the apparatus 1 from the slot 3a regardless of the position of the slot 3a where the disk Ds is inserted, to thereby prevent the disk Ds from being accommodated into the apparatus 1. Specifically, if a path (a right-downwardly hatched area in FIG. 14) along which the disk Ds moves when the disk Ds is inserted until the rear end of the disk Ds in its insertion direction coincides with the slot 3a while the disk Ds is pulled over to the left to come in sliding contact with the guide member 27 with the disk abutting portion 18 removed is defined as a first area, and if a path (a left-downwardly hatched area in FIG. 14) along which the 8-cm-diameter disk Ds moves when the disk Ds is inserted until the rear end of the second disk-shaped recording medium coincides with the slot 3a while the disk Ds is pulled over to the right to come in sliding contact with the guide member 29 with the disk abutting portion 18 removed is defined as a second area, the disk abutting portion 18 abuts the disk Ds before the entire disk Ds is inserted into the apparatus 1 through the slot 3a even when the disk Ds is inserted into the apparatus through any position of the slot 3a by disposing the disk support arm such that the disk abutting portion 18 is located in the area (the area where the right-downward hatching and the left-downward hatching overlap each other) where the first area and the second area overlap while waiting for the loading of a disk.

When the disk apparatus in the present embodiment is waiting for the loading of a disk D (a position indicated by a broken line in FIG. 15), the disk abutting portion 18 provided in the disk support arm 17 is located at the position where the distance (dC) spaced from the guide member 27 is 4.1 cm, the distance (dD) spaced from the guide member 29 is 7.8 cm, and the distance (dE) spaced from the slot 3a is 5.1 cm (in the present invention, the spaced distances dC, dD, dE are required to be set smaller than the diameter dB of the smaller-diameter disk Ds).

Figure 15:
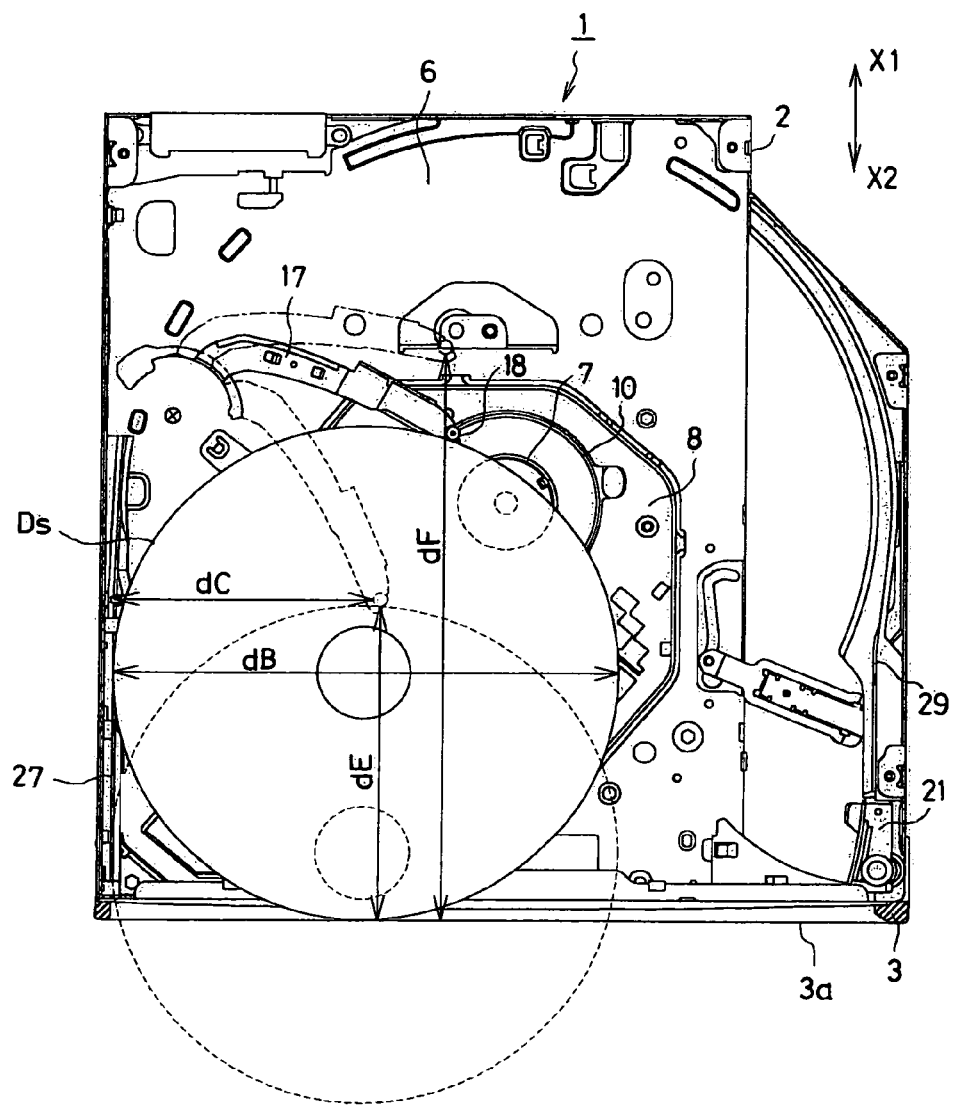
FIG. 15 illustrates an operational state of the present invention.

FIG. 15 illustrate a situation in which an operator pulls over an 8-cm-diameter disk Ds to the left of the slot 3a and inserts it into the apparatus 1 while it is brought into sliding contact with the guide member 27. As shown by a broken line in FIG. 15, in the middle of the insertion of the disk Ds, the front end of the disk Ds in its insertion direction abuts the disk abutting portion 18 provided at the tip of the disk support arm 17. If the operator further pushes the disk Ds into the apparatus, the disk abutting portion 18 is pushed by the disk Ds and thus the disk support arm 17 swings back. However, even when the disk Ds is pushed into the apparatus to the full until the rear end of the disk Ds in its insertion direction coincides with the disk slot 3a, the disk support arm 17 can be swung only to the position indicated by a solid line in FIG. 15, but it cannot reach the auto-loading starting position (indicated by a one-dot chain line in FIG. 15). Thus, the loading mechanism C cannot start the operation. Thereafter, if the operator gets his/her hand off the disk Ds, the disk support arm 17 swings forward by the spring force of the tension coil spring 44 and is returned to an insertion standby position (indicated by a broken line in FIG. 15). Accordingly, the disk D is pushed back in the ejection direction by the disk support arm 17, so that the disk D can be surely pulled out.

In addition, in the disk apparatus 1 of the present embodiment, the spaced distance dF between the disk abutting portion 18 and the slot 3a when the disk support arm 17 is located at the loading starting position is set larger than the diameter dB of the disk Ds (the second disk-shaped recording medium). Thus, the operation of the loading mechanism C can be surely prevented from being started when the disk Ds is inserted.

Figure 16:
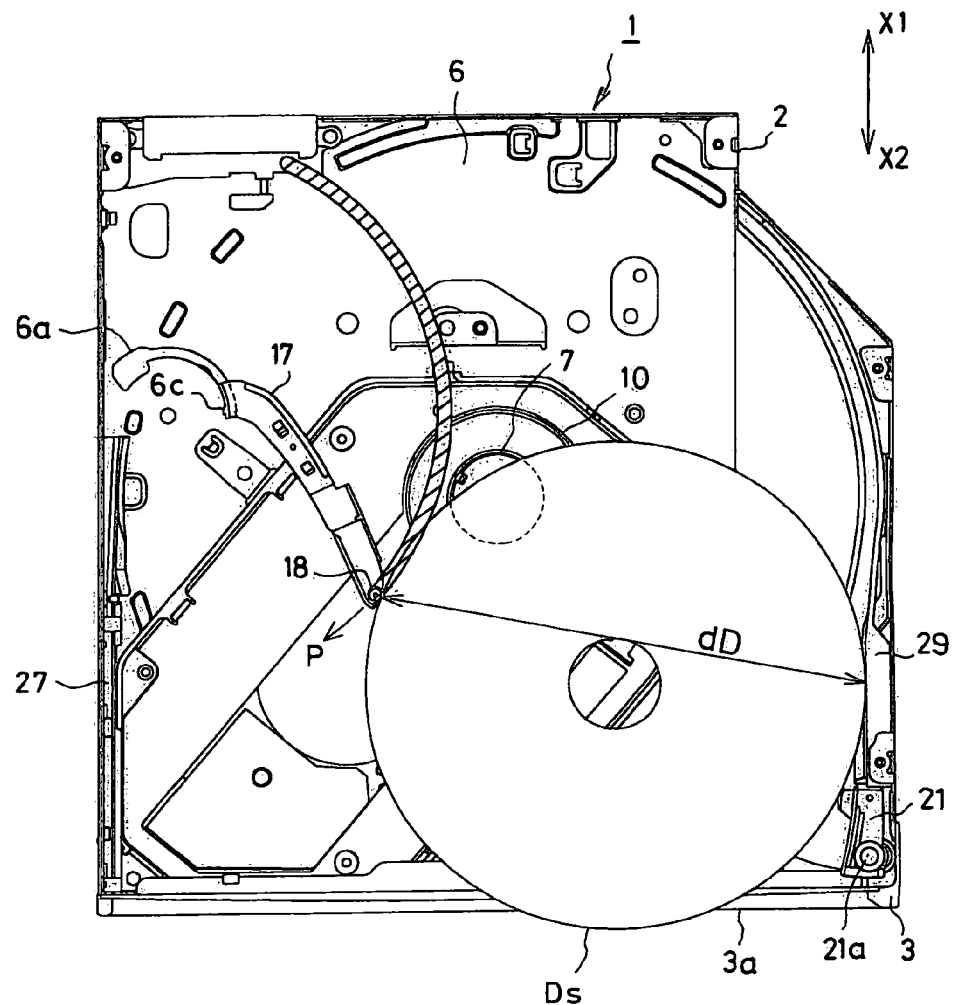
FIG. 16 illustrates the operational state of the present invention.

FIG. 16 illustrates a situation in which an operator pulls over an 8-cm-diameter disk Ds to the right of the slot 3a, inserts it into the apparatus 1 while it is brought into sliding contact with the guide member 29. In the middle of the insertion of the disk Ds, the front end of the disk Ds in its insertion direction abuts the disk abutting portion 18 provided at the tip of the disk support arm 17. If the operator further pushes the disk Ds into the apparatus, a force is applied to the disk support arm 17 in the direction of an arrow P since the disk abutting portion 18 is pushed by the disk Ds. If the disk support arm 17 rotates in the P direction, and then the spaced distance between the disk abutting portion 18 and the guide member 29 becomes larger than the diameter dB of the disk Ds, the disk Ds is fully inserted and thus cannot be pulled out. However, according to the disk apparatus 1 of the present embodiment, the disk support arm 17 abuts the end 6c of the slit 6a formed in the base panel 6 in the state shown FIG. 16, and the swing of the disk support arm 17 in the direction of an arrow P is inhibited. Therefore, the spaced distance between the disk abutting portion 18 and the guide member 29 cannot be larger than the diameter dB of the disk Ds. Accordingly, the disk Ds cannot move in the X1 direction in the state shown FIG. 16, and stops with its rear end protruding out of the apparatus. Thus, the disk Ds can be surely pulled out.

In addition, in the disk apparatus 1 of the present embodiment, even when an operator inserts a disk Ds into the apparatus from the middle position of the slot 3a, the front end of the disk Ds in its insertion direction abuts the disk abutting portion 18 formed at the tip of the disk support arm 17. Also, when a force is applied to the disk support arm 17 in the direction of an arrow P, the situation becomes like FIG. 16, and thus the further inserting operation cannot be performed. In addition, when a force is applied to the disk support arm 17 counterclockwise, like FIG. 15, the disk support arm 17 once swings counterclockwise, but is returned to the insertion standby position by the spring force of the tension coil spring 44, and thus the disk Ds is pushed back in the ejection direction. As a result, the disk Ds can surely be pulled out.

In addition, the area indicated by the lateral hatching is a path along which the disk abutting portion 18 moves when the disk support arm 17 swings. According to the disk apparatus 1 of the present embodiment, as seen from the top, the moving path of the disk abutting portion 18 is constructed so as not to overlap the arrangement position of the clamping head 7 protruding upward from the turntable 10, so that the descending amount of the clamping head 7 can be restrained to realize the slimming of the disk apparatus 1.

Figure 17:
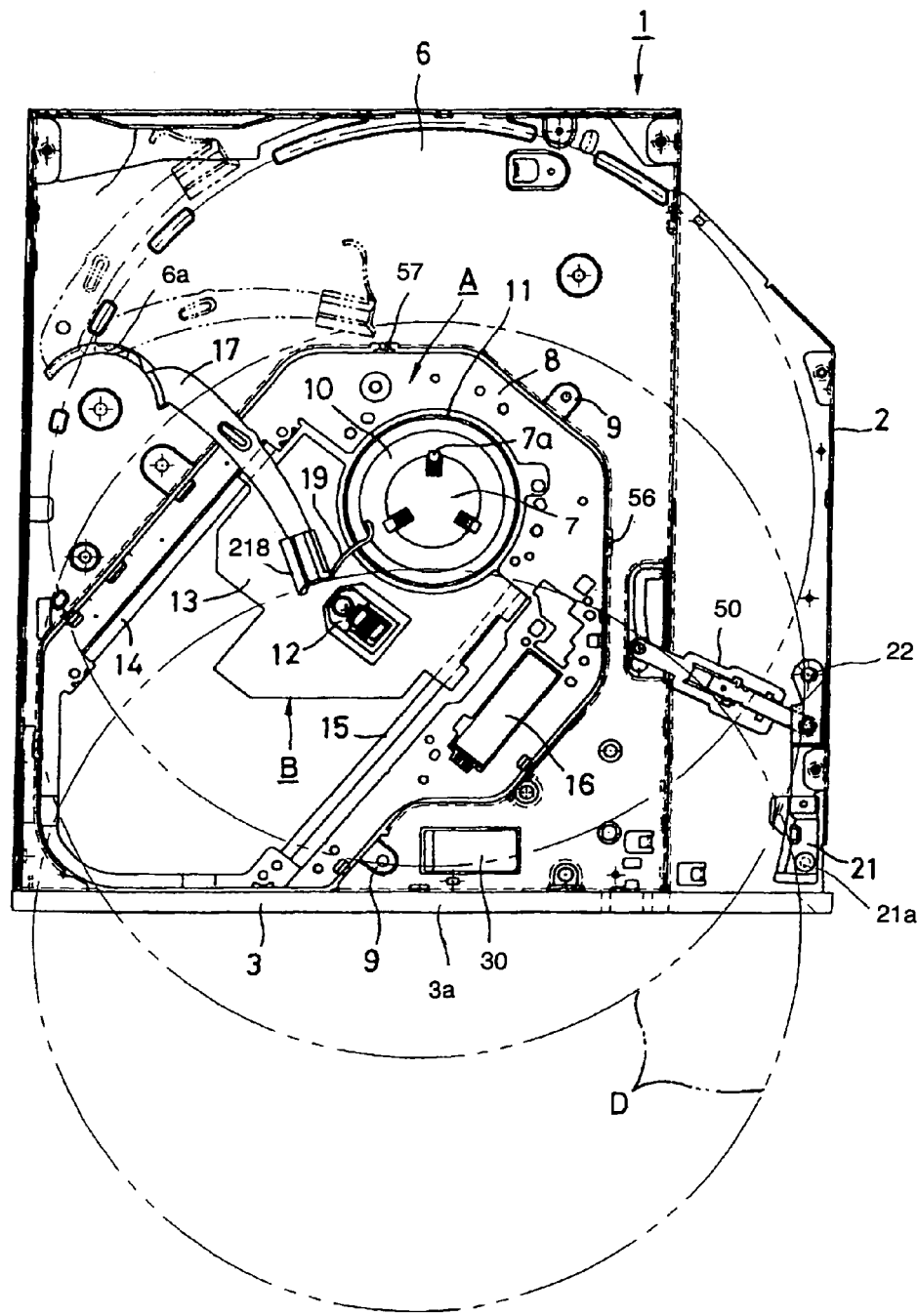
FIG. 17 is a plan view of an internal structure of the disk apparatus relating to a second embodiment of the present invention.

Hereinafter, the second embodiment of the present invention will be described. The reference numeral 17 in FIG. 17 illustrates a disk support arm that guides a 12-cm-diameter disk D to into the apparatus and pushes it out of the apparatus. A stopper 19 is attached to the tip of the disk support arm for inhibiting the erroneous insertion of a disk other than a 12-cm-diameter disk, specifically 8-cm-diameter disk and preventing the entrance thereof when it is erroneously inserted. In addition, a driving mechanism for swinging the disk support arm 17 is the same as the arm driving mechanism C1 employed in the first embodiment and thus the description thereof will be omitted.

Figure 18:
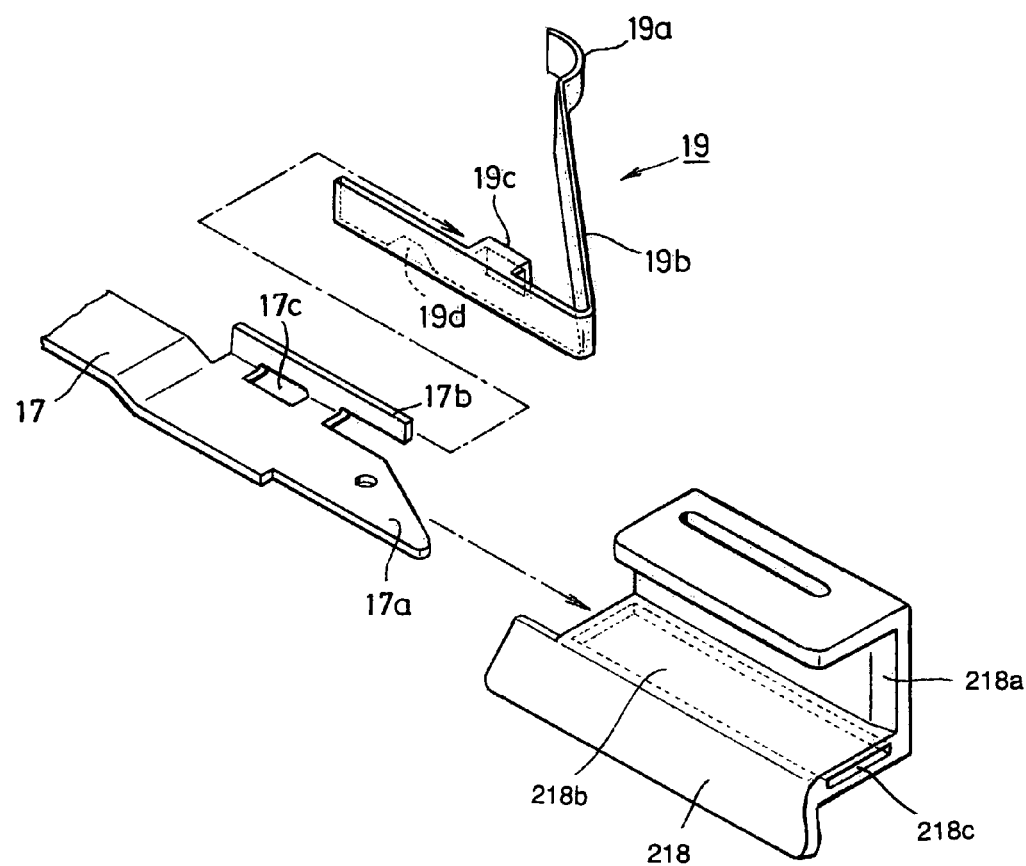
FIG. 18 is an exploded perspective view explaining the configuration of the front end of the disk support arm.

As shown in FIG. 18, the stopper 19 has a contacting portion 19a abutting the front circumferential edge of an 8-cm-diameter disk attached to the tip of the disk support arm 17 with an elastic portion 19b interposed therebetween. More specifically, a locking portion 19c of the stopper 19 is engaged with a locked portion 17b provided at the tip of the disk support arm 17, and a locking pawl 19d of the stopper 19 is inserted into the through-hole 17c provided at the tip of the disk support arm 17, so that the stopper 19 is attached to the tip of the disk support arm 17. In the present embodiment, a leaf spring, an elastic body, is mounted to the tip of the disk support arm 17 as a stopper 19. In addition, the detailed operation when an 8-cm-diameter disk is erroneously inserted will be described later.

A holder 218 that supports the end of the disk D is fixed to the tip of the disk support arm 17. The holder 218 has a receiving end 218a formed at its front end, as shown in FIG. 18, and a holding groove 218b at its side surface. In addition, the tip 17a of the disk support arm 17 is inserted into a support arm mounting opening 218c, and is fixed to the disk support arm 17 by tightening it with screws from the rear surface.

The holder 218 is fixed to the disk support arm 17 to prevent the stopper 19 from coming out of the disk support arm 17. In addition, the entire holder 218 may be formed with a material having a high coefficient of friction or may have silicon materials adhered on the receiving end 218a and the holding slot 218b, so that the friction can exert on the disk D. With such a configuration, the holder can easily prevent the rotation of the disk D when the clamping of the disk in rotation is released and the disk D is supported by the disk support arm 17.

Next, the operation aspect of the disk apparatus 1 when an operator inserts a 12-cm-diameter disk will be described. In the configuration of FIG. 17, when the operator inserts the disk D, the disk is guided into the apparatus by the holder 218 of the disk support arm 17 and the leading arm 21. In addition, the state of the disk support arm 17 in FIG. 17 is an initial state in which the operator inserts the disk D through the slot 3a, and the front end of the disk D is received and supported by the receiving end 218a of the holder 218 provided at the tip of the disk support arm 17.

If the operator inserts a disk D into the apparatus in the initial state, the holder 218 is pressed by the disk D and thus the disk support arm 17 swings in the disk-insertion direction, reaches the auto-loading starting location, and then the limit switch 47 is operated by the disk support arm 17.

If the limit switch 47 is operated, the loading motor 30 is operated and the carrying mechanism begins to be driven. Then, the loading slider 32 begins to retreat, and the lever arm 50 is pulled in accordance with the retreat of the loading slider 32. Thereby, the leading arm 21 swings, and the disk D is chucked by the disk support arm 17.

In addition, when the loading slider 32 retreats, the disk support arm 17 and the leading arm 21 swing backward to load the disk D, and the center hole Da of the disk D is located on the clamping head 7. In addition, at this time, the disk D is chucked and held by the holder 218 and the leading arm 21, and the disk support arm 17 and the leading arm 21 swing in synchronization with each other.

Thereafter, the follower pins 56 and 57 fixed to the frame member 8 are guided by the loading slider 32 and a cam groove formed in the slider member 54 that advance and retreat in synchronization with the loading slider 32, so that the frame member 8 is operated to ascend and descend. That is, when the loading slider 32 further retreats, the follower pins 56 and 57 are guided and raised by a slope portion of the cam groove, and then the frame member 8 and the clamping head 7 also ascend.

Then, when the clamping head 7 ascends, the chuck pawl 7a abuts the opening end of the center hole Da of the disk D, and when the clamping head 7 further ascends, the chuck pawl 7a pushes up the disk D and presses the opening end of the center hole Da of the disk D against the projection 2b of the opening 2a of the chassis case. Then, the clamping head 7 is fitted into the center hole Da of the disk D, and a chucking claw 7a locks the opening end of the disk D. That is, the disk D is fixed onto the turntable 10 to complete the clamping.

After the clamping head clamps the center hole Da of the disk D, and the loading slider 32 slightly retreats, the disk support arm 17 also swings slightly, and the chucking of the disk D by the holder 218 is released. At this time, the leading arm 21 also swings slightly in synchronization therewith, to release the chucking of the disk D. In addition, the frame member 8 is in the state in which the follower pins 56 and 57 slightly descend in the cam groove to allow the rotation of the disk D.

The operation aspect of the disk apparatus 1 when a 12-cm-diameter disk D is loaded has been described hitherto. When the disk D is unloaded, the process and the operation of each component are opposite to the above. That is, the carrying mechanism is driven reversely, and the loading slider 32 is advanced to swing the disk support arm 17 forward. Also, in FIG. 17, the disk support arm 17 swings to the position indicated by the solid line, and about half of the disk D is ejected from the slot 3a to complete the unloading.

Figure 19:
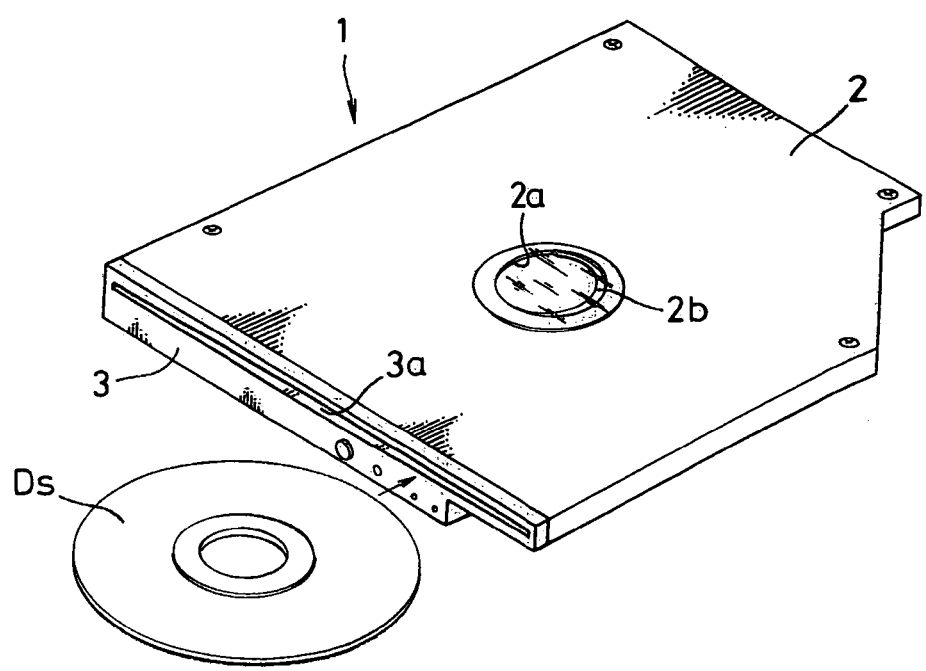
FIG. 19 is a perspective view of the state in which a smaller-diameter disk is inserted into the disk apparatus of FIG. 17.

Next, in the above-described disk apparatus 1, as shown in FIG. 19, the operation when an 8-cm-diameter disk Ds is inserted through the right side of the slot 3a will be described.

Figure 20:
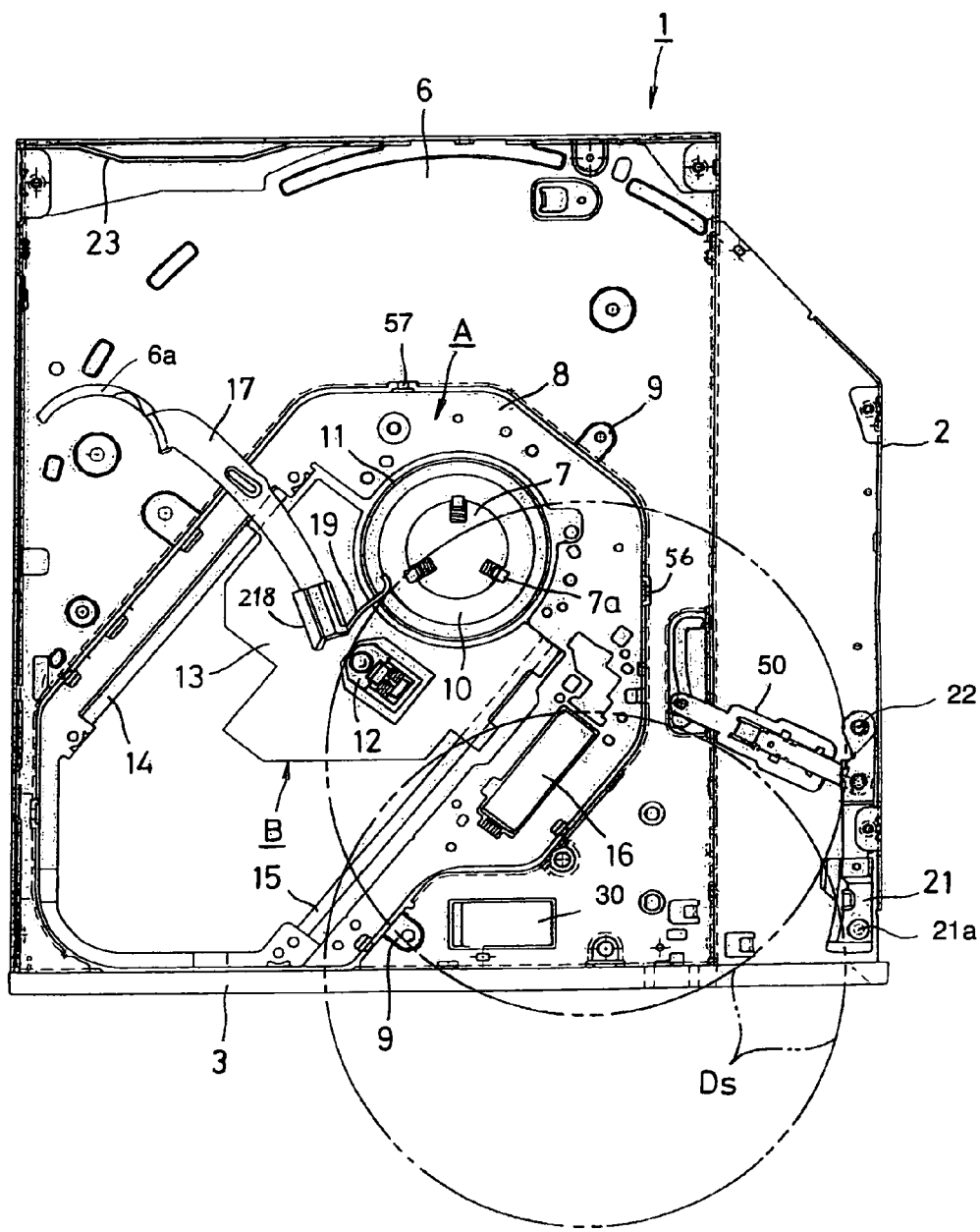
FIG. 20 illustrates the operation aspect of the present invention.

When the operator inserts the disk Ds from the right side (the leading arm 21 side) of the slot 3a of the disk apparatus 1, as shown in FIG. 20, before the entire 8-cm-diameter disk Ds is inserted into the apparatus, the front circumferential edge of the disk Ds abuts the contacting portion 19a of the stopper 19 attached to the tip of the disk support arm 17. Accordingly, the insertion of the 8-cm-diameter disk Ds is inhibited, and the entrance thereof into the apparatus is inhibited.

In the state shown in FIG. 20, if the operator further pushes the disk Ds into the apparatus, the contacting portion 19a of the stopper 19 is pressed by the front circumferential edge of the disk Ds. However, in the present embodiment, a leaf spring, an elastic body, is utilized as a stopper 19, and the contacting portion 19a is fixed to the disk support arm 17 with the elastic portion 19b of the leaf spring disposed therebetween.

Thereby, even when the contacting portion 19a of the stopper 19 contacting the front circumferential edge of the disk Ds is pressed and pushed in, the contacting portion 19a is pushed back by the elastic force of the elastic portion 19b generated by the pressing. Therefore the disk Ds is pushed back to the operator side. That is, the disk Ds is pushed back to the operator side from the slot 3a as if it jumps out. Accordingly, the disk Ds is pushed back in the carrying direction. Thus, if the disk apparatus 1 cannot cope with the driving of the 8-cm-diameter disk Ds, the operator can realize his mistake, and, finally, the insertion of the 8-cm-diameter disk can be inhibited.

In addition, as shown in FIG. 20, the position of the disk support arm 17 when the 8-cm-diameter disk Ds is inserted and the front circumferential edge of the disk Ds abuts the contacting portion 19a of the stopper 19 is the position where the apparatus waits for the insertion of the standard-diameter, that is, 12-cm-diameter disk, and also s the position where the disk support arm 17 swings to the foremost. At this position, if a great force that press the disk support arm 17 is applied to the disk support arm 17 to swing it clockwise, the disk support arm 17 may be damaged. However, according to the present embodiment, even when the disk Ds is further pushed into from the position in the figure, the elastic portion 19b of the stopper 19 that abuts the front circumferential edge of the disk Ds is transformed to absorb the pressing force. Accordingly, unlike the above, a great force cannot is not applied to the disk support arm 17, and the breakdown of the disk support arm 17 can be prevented.

As described above, even when the operator inserts an 8-cm-diameter disk Ds erroneously, the erroneous insertion by the operator is inhibited and the 8-cm-diameter disk is pushed back to the operator side before the entire 8-cm-diameter disk Ds is inserted into the apparatus. Therefore, it is possible to prevent a problem that the 8-cm-diameter disk Ds cannot be pulled out of the inside of the apparatus, and to prevent the breakdown of the disk apparatus 1.

Figure 21:
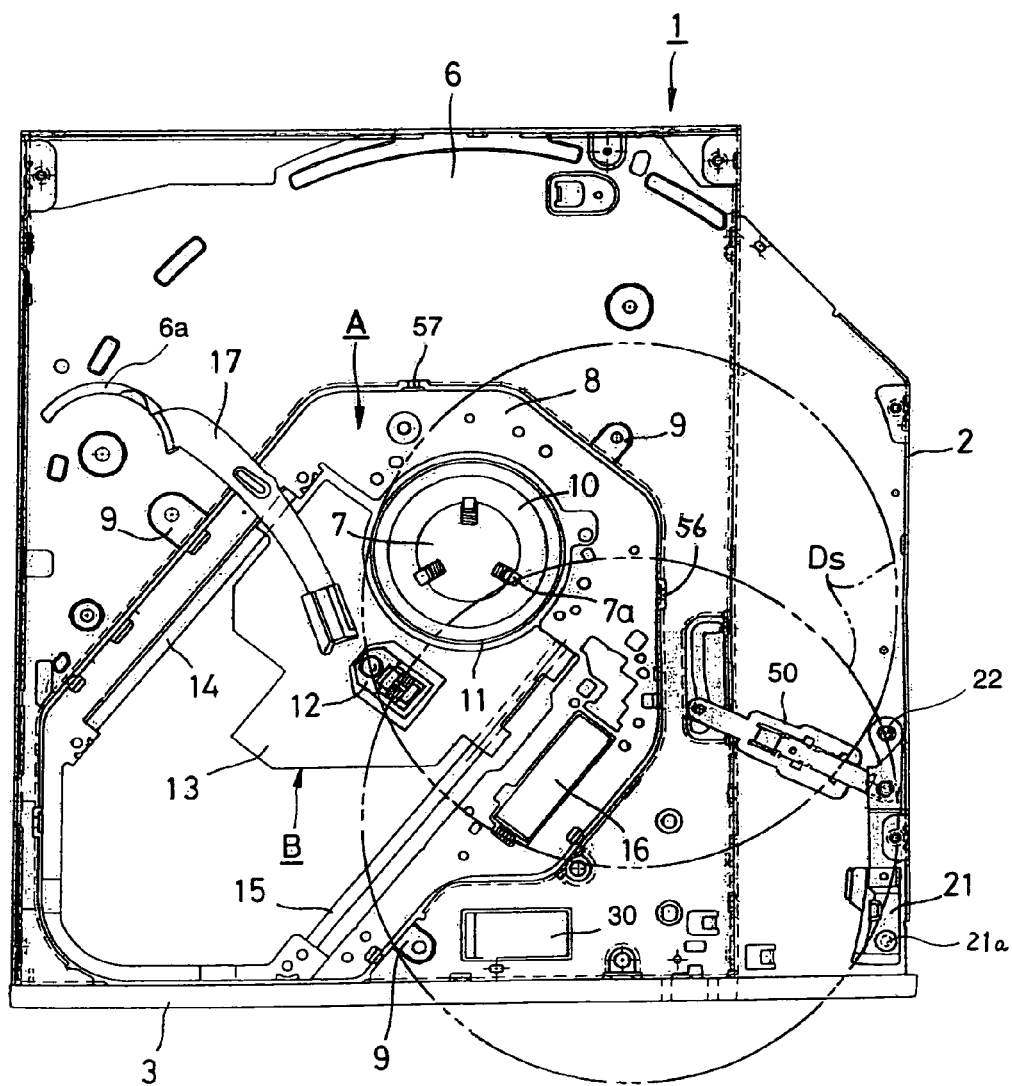
FIG. 21 is a plan view for explaining the disadvantages when the present invention is not embodied.

FIG. 21 illustrates a situation in which an operator insert an 8-cm-diameter disk from the right side of the slot 3a of the disk apparatus 1 that does not comprises the stopper 19 for preventing the entrance of an 8-cm-diameter disk Ds. In FIG. 21, since the disk support arm 17 of the disk apparatus 1 is required to be disposed so as not to pass above the clamping head 7, the disk support arm 17 is disposed to swing to the left from the clamping head 7. In addition, the leading arm 21 is disposed to wait for the insertion of a 12-cm-diameter disk D at the right side of the apparatus. Considering this configuration of the disk apparatus 1, a space wide enough to insert an 8-cm-diameter disk Ds into the apparatus can exist between the disk support arm 17 and the leading arm 21.

To prevent the space from being an entrance path of an 8-cm-diameter disk, in the present embodiment, the stopper 19 is attached to the disk support arm 17 as described above to block the entrance path of the 8-cm-diameter disk Ds. However, when the stopper 19 is not attached to the disk apparatus 1, the space may become the entrance path, and the 8-cm-diameter disk may enter the apparatus 1, which makes it impossible for the operator to pull out the disk Ds.

In addition, in the disk apparatus of the present embodiment, when the operator inserts an 8-cm-diameter disk from the right side of the slot 3a of the apparatus 1, the front end of the 8-cm-diameter disk abuts and is supported by the holder 218 formed at the tip of the disk support arm 17 that waits for the loading of a 12-cm-diameter disk D at its foremost position. However, even when the disk Ds is further pushed into the apparatus, the limit switch 47 cannot swing until the disk support arm 17 is operated.

That is, the 8-cm-diameter disk has a smaller diameter. Therefore, even when the front end of the disk Ds abuts and is supported by the holder 218 of the disk support arm 17, the carrying mechanism cannot be operated, and thus the disk support arm 17 is returned to the insertion standby position, the front position. Therefore, the 8-cm-diameter disk Ds is pushed back to the operator side by the disk support arm 17, and thus the entrance of an 8-cm-diameter disk Ds into the apparatus can surely be inhibited.

Figure 22:
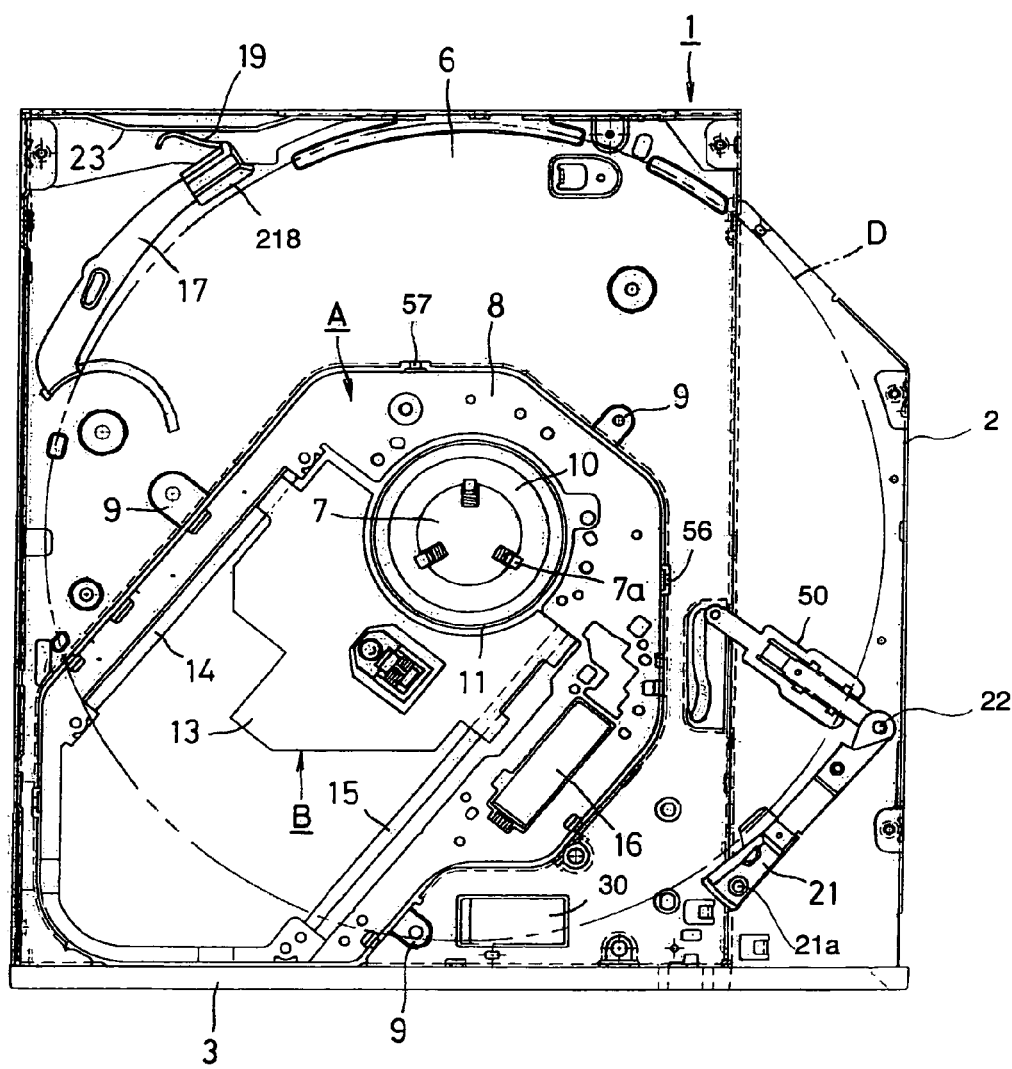
FIG. 22 illustrates the operational aspect of the present invention.
Figure 23:
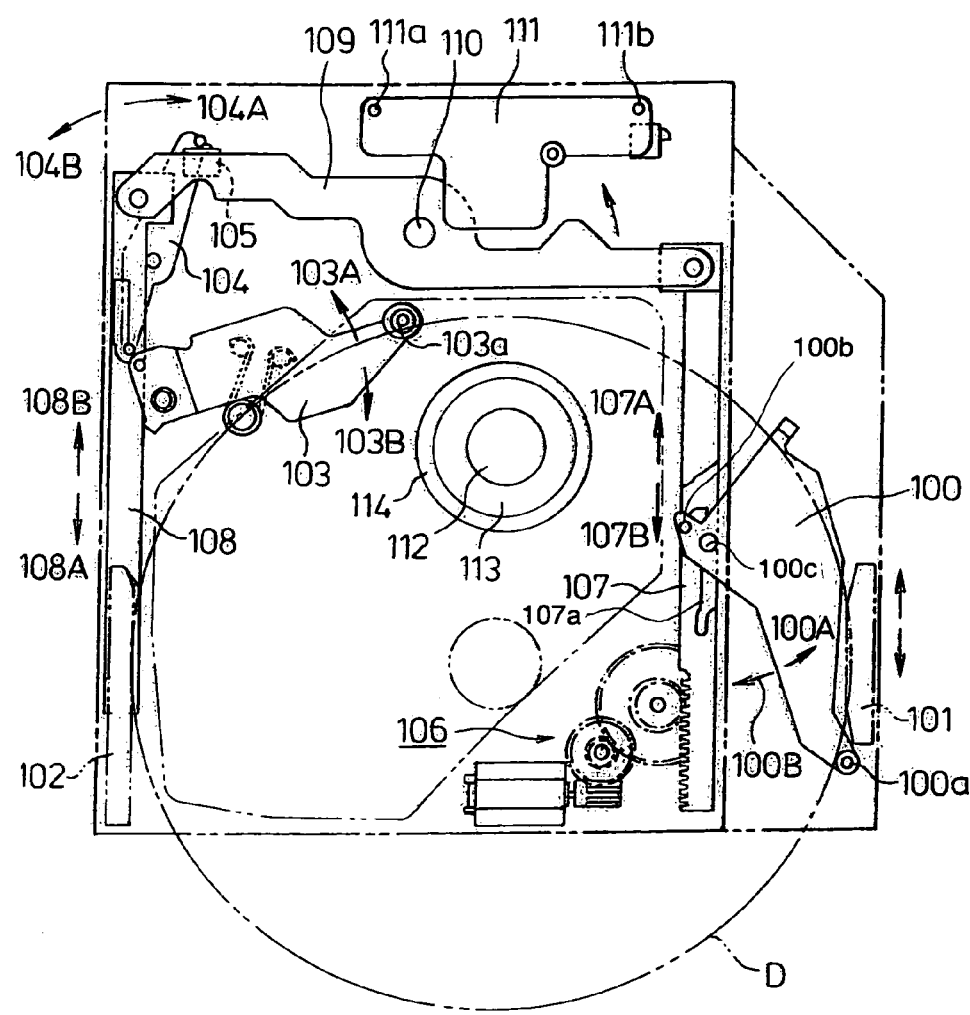
FIG. 23 illustrates the configuration of the conventional disk apparatus.
Figure 24:
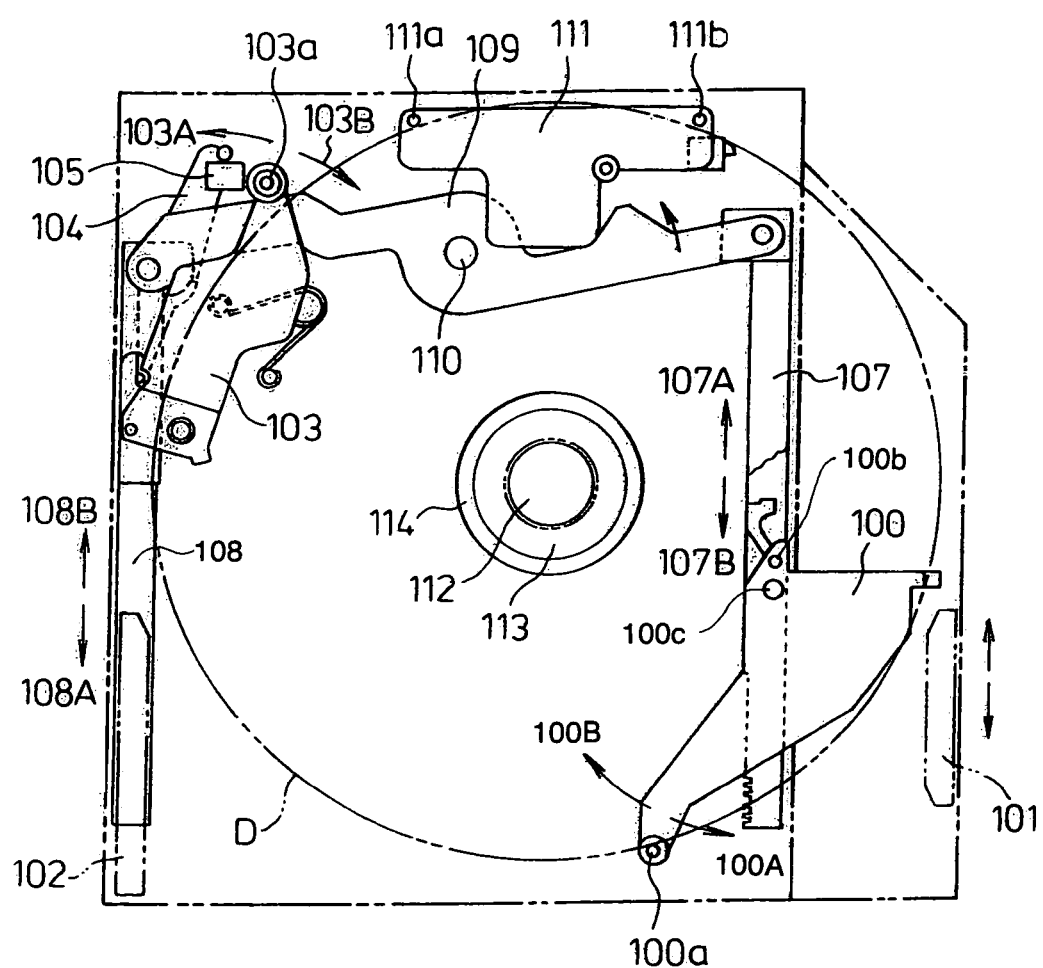
FIG. 24 illustrates the configuration of the conventional disk apparatus.

FIG. 22 illustrate a situation in which a 12-cm-diameter, standardized diameter, disk D has been inserted into the disk apparatus 1 of the present embodiment and the disk D can be rotated after the clamping operation. In FIG. 22, after the clamping head 7 clamps the center hole Da of the disk D and the chucking of the disk D by the holder 218 of the disk support arm 17 is released, the contacting portion 19a of the stopper 19 attached to the tip of the disk support arm 17 comes in sliding contact with a fixed portion 23 on the inner wall of the apparatus. That is, the chucking of the disk D by the holder 218 of the disk support arm 17 is released. Therefore, if the disk support arm 17 slightly retreats, the contacting portion 19a of the stopper 19 comes in sliding contact with the fixed portion 23, and the position of the disk support arm 17 is fixed.

Therefore, while the disk D clamped on the clamping head 7 by the spindle motor 11 is rotationally driven to record and reproduce information, a fierce vibration or rattling of the disk support arm 17 can be suppressed. Thus, the noise or the breakdown of each component caused by the vibration or rattling of the disk support arm 17 can be prevented. In addition, in the present embodiment, a leaf spring, an elastic body, is utilized as the stopper 19, and the disk support arm 17 is fixed to the fixed portion 23 with the elastic portion 19b of the leaf spring interposed therebetween. Thus, the vibration or rattling of the disk support arm 17 can be surely prevented.

In addition, in the present embodiment, a leaf spring is utilized as the stopper 19 and is attached to the disk support arm 17. However, the contacting portion that abuts the front circumferential edge of the 8-cm-diameter disk Ds may be attached to the disk support arm 17 with the elastic portion interposed therebetween.

What is claimed is:

1. A disk apparatus comprising:
   a slot for inserting a disk-shaped recording medium therethrough;
   a first guide member for guiding one side of the disk-shaped recording medium inserted through the slot;
   a second guide member for guiding the other side of the disk-shaped recording medium inserted through the slot;
   a disk abutting portion for abutting the disk-shaped recording medium inserted through the slot;
   a disk support arm for carrying the disk-shaped recording medium by supporting and swinging the disk-shaped recording medium; and
   a recording/reproducing unit for recording and/or reproducing information on and/or from the disk-shaped recording medium carried into the apparatus by the disk support arm,
   wherein a first disk-shaped recording medium having a diameter dA is loaded or unloaded by swinging the disk support arm, and
   wherein the disk support arm is disposed such that the disk abutting portion abuts and the disk support arm inhibits further insertion of a second disk-shaped recording medium having a diameter dB that is smaller than dA before the entire second disk-shaped recording medium is inserted into the apparatus through any place of the slot while waiting for the insertion of the first disk-shaped recording medium through the slot.

2. The disk apparatus according to claim 1,
   wherein, supposing that there is no disk abutting portion, an area through which the second disk-shaped recording medium passes when the second disk-shaped recording medium is inserted until a rear end of the second disk-shaped recording medium in its insertion direction coincides with the slot while being brought into sliding contact with the first guide member is defined as a first area, and
   an area through which the second disk-shaped recording medium passes when the second disk-shaped recording medium is inserted until a rear end of the second disk-shaped recording medium in its insertion direction coincides with the slot while being brought into sliding contact with the second guide member is defined as a second area,
   wherein, the disk support arm is disposed such that the disk abutting portion is located in a range within which the first area and the second area overlap each other while waiting for the insertion of a disk-shaped recording medium through the slot.

3. The disk apparatus according to claim 1,
wherein the diameter dA of the first disk-shaped recording medium is 12 cm, and the diameter dB of the second disk-shaped recording medium is 8 cm.

4. A disk apparatus for loading or unloading a disk having a prescribed outer diameter by driving a disk support arm, the apparatus comprising a disk entrance inhibiting means for inhibiting a smaller diameter disk having a smaller diameter than the prescribed outer diameter from being inserted through a disk slot out of the supporting range of the disk support arm while the disk support arm is waiting for the loading of a disk.

5. The disk apparatus according to claim 4,
wherein the disk entrance inhibiting means is a stopper having an abutting portion which contacts a front circumferential edge of the smaller diameter disk in its entrance direction, and the stopper is attached to the support arm.

6. The disk apparatus according to claim 5,
wherein the stopper has elasticity, and when the abutting portion of the stopper is pressed by the front circumferential edge of the smaller diameter disk, the smaller diameter disk is pushed back in its unloading direction by an elastic force generated by the pressing of the disk.

7. The disk apparatus according to claim 5,
wherein when the disk having the prescribed outer diameter is completely loaded and is not supported any more by the support arm, the abutting portion of the stopper is brought into sliding contact with an inner wall of the apparatus, to generate an anti-vibration function against the support arm.

8. The disk apparatus according to claim 2,
wherein the diameter dA of the first disk-shaped recording medium is 12 cm, and the diameter dB of the second disk-shaped recording medium is 8 cm.

9. The disk apparatus according to claim 6,
wherein when the disk having the prescribed outer diameter is completely loaded and is not supported any more by the support arm, the abutting portion of the stopper is brought into sliding contact with an inner wall of the apparatus, to generate an anti-vibration function against the support arm.

* * * * *